US012068702B2

United States Patent
Orii et al.

(10) Patent No.: US 12,068,702 B2
(45) Date of Patent: Aug. 20, 2024

(54) ELECTRIC MOTOR CONTROL DEVICE

(71) Applicant: Mitsubishi Electric Corporation, Tokyo (JP)

(72) Inventors: Masahiko Orii, Tokyo (JP); Tatsuya Mori, Tokyo (JP); Hiroko Ikeda, Tokyo (JP); Toshihiro Matsunaga, Tokyo (JP); Kenji Ikeda, Tokyo (JP); Kenta Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 120 days.

(21) Appl. No.: 17/920,607

(22) PCT Filed: May 19, 2020

(86) PCT No.: PCT/JP2020/019717
§ 371 (c)(1),
(2) Date: Oct. 21, 2022

(87) PCT Pub. No.: WO2021/234802
PCT Pub. Date: Nov. 25, 2021

(65) Prior Publication Data
US 2023/0155528 A1 May 18, 2023

(51) Int. Cl.
*H02P 21/06* (2016.01)
*H02P 21/05* (2006.01)
*H02P 25/22* (2006.01)

(52) U.S. Cl.
CPC .............. *H02P 21/06* (2013.01); *H02P 21/05* (2013.01); *H02P 25/22* (2013.01)

(58) Field of Classification Search
CPC ........... H02P 21/06; H02P 21/05; H02P 25/22
See application file for complete search history.

(56) References Cited

U.S. PATENT DOCUMENTS 11,711,045 B2 * 7/2023 Omata ................... H02P 25/22
                                                              318/496
2012/0194109 A1 * 8/2012 Uryu .................... B62D 5/0403
                                                              318/400.15

(Continued)

FOREIGN PATENT DOCUMENTS

JP      2000-018968 A       1/2000
JP      2011-169653 A       9/2011

(Continued)

OTHER PUBLICATIONS

International Search Report of PCT/JP2020/019717 dated Aug. 18, 2020 [PCT/ISA/210].

(Continued)

*Primary Examiner* — Zoheb S Imtiaz
(74) *Attorney, Agent, or Firm* — Sughrue Mion, PLLC; Richard C. Turner

(57) ABSTRACT

In an electric motor control device which controls rotation of an AC electric motor having two sets of three-phase windings and provided with a resolver having two systems by calculating voltage command values on dq axes, dq conversion of currents of first three-phase windings is performed using a first angle calculated from output of the first system of the resolver, and dq conversion of currents of second three-phase windings is performed using a second angle calculated from output of the second system of the resolver. With both d-axis current command values set at the same value, respective voltage command values on dq axes are calculated and respectively converted into voltage command values for voltage application to the first three-phase windings, using the first angle, and converted into voltage command values for voltage application to the second three-phase windings, using the second angle.

12 Claims, 25 Drawing Sheets

(56) References Cited

U.S. PATENT DOCUMENTS

2020/0363233 A1    11/2020  Ikeda et al.
2023/0170830 A1*  6/2023  Lee ........................ H02P 21/22
                                                                              318/811

FOREIGN PATENT DOCUMENTS

WO        2019/123592 A1    6/2019
WO        2019/150984 A1    8/2019

OTHER PUBLICATIONS

Extended European Search Report issued Jun. 9, 2023 in European Application No. 20936972.7.

* cited by examiner

ELECTRIC MOTOR CONTROL DEVICE

CROSS REFERENCE TO RELATED APPLICATIONS

This application is a National Stage of International Application No. PCT/JP2020/019717 filed on May 19, 2020.

TECHNICAL FIELD

The present disclosure relates to an electric motor control device.

BACKGROUND ART

As an angle detector for detecting the rotation angle of a motor, a resolver is often used. While the resolver is known as a robust angle detector, the resolver as an angle detector for a motor is also required to be imparted with redundancy on the basis of a demand for failure resistance of a motor driving system. For example, Patent Document 1 discloses a resolver including an annular stator having resolver windings composed of excitation windings and output windings, and a rotor rotatably provided on the inner side of the annular stator, the resolver windings being formed as first-system and second-system resolver windings provided to one annular stator, thus having a dual-system configuration.

Meanwhile, Patent Document 2 discloses that, in paragraphs [0043] and [0044] and FIG. 10 of this document, teeth of a stator are divided into four groups in the circumferential direction, the four groups are defined as a "first-system first block B1", a "second-system first block B2", a "first-system second block B3", and a "second-system second block B4", and the tooth blocks forming one system are arranged at positions opposed to each other, whereby imbalance of a magnetic flux when the stator becomes eccentric is reduced and thus angle detection accuracy can be improved.

CITATION LIST

Patent Document

Patent Document 1: JP 2000-18968A
Patent Document 2: WO2019/123592A1

SUMMARY OF THE INVENTION

Problems to be Solved by the Invention

As in Patent Documents 1 and 2, in the case where teeth of a stator are divided into a plurality of groups in the circumferential direction and the number of divisional groups is increased, depending on the relative eccentric direction between the stator and the rotor, magnetic resistance imbalance between the stator and the rotor is not eliminated, and error occurs in the detected angle due to a first-order component contained in the output signal of the resolver, thus causing a problem that torque ripple occurs due to the angle error.

The present disclosure has been made to solve the above problem, and an object of the present disclosure is to provide an electric motor control device that can suppress ripple due to angle error even when eccentricity has occurred in a resolver.

Solution to the Problems

An electric motor control device according to the present disclosure is an electric motor control device configured to control rotation of an AC electric motor having first three-phase windings and second three-phase windings and provided with a resolver in which a plurality of teeth provided to a stator are wound with a first excitation winding and a first output winding as a first system and a second excitation winding and a second output winding as a second system such that a number of the teeth wound with the windings in the first system and a number of the teeth wound with the windings in the second system are equal to each other. The electric motor control device includes: a first voltage application unit which applies AC voltages for three phases to the first three-phase windings; a second voltage application unit which applies AC voltages for three phases to the second three-phase windings; a first current detector which detects current for each phase of the first three-phase windings; a second current detector which detects current for each phase of the second three-phase windings; and a controller which outputs AC voltage to be applied to the first excitation winding and AC voltage to be applied to the second excitation winding, calculates first voltage command values which are voltage command values for three phases in the first voltage application unit and outputs the first voltage command values to the first voltage application unit, and calculates second voltage command values which are voltage command values for three phases in the second voltage application unit and outputs the second voltage command values to the second voltage application unit. The controller is configured to: perform coordinate conversion of current values for three phases detected by the first current detector into a first d-axis current value and a first q-axis current value, using a first angle obtained from an output of the first system of the resolver, and perform coordinate conversion of current values for three phases detected by the second current detector into a second d-axis current value and a second q-axis current value, using a second angle obtained from an output of the second system of the resolver; select either a first d-axis current command value candidate calculated from a first current command value inputted as a current command value for the first three-phase windings or a second d-axis current command value candidate calculated from a second current command value inputted as a current command value for the second three-phase windings, and set the selected one as a d-axis current command value; calculate a first d-axis voltage command value so that the d-axis current command value and the first d-axis current value coincide with each other, calculate a first q-axis voltage command value so that a first q-axis current command value obtained from the first current command value and the first q-axis current value coincide with each other, and perform coordinate conversion of the first d-axis voltage command value and the first q-axis voltage command value, using the first angle, to calculate the first voltage command values; and calculate a second d-axis voltage command value so that the d-axis current command value and the second d-axis current value coincide with each other, calculate a second q-axis voltage command value so that a second q-axis current command value obtained from the second current command value and the second q-axis current value coincide with each other, and perform coordinate conversion of the second d-axis voltage command value and the second q-axis voltage command value, using the second angle, to calculate the second voltage command values.

Another electric motor control device according to the present disclosure is an electric motor control device configured to control rotation of an AC electric motor having first three-phase windings and second three-phase windings and provided with a resolver in which a plurality of teeth provided to a stator are wound with a first excitation winding and a first output winding as a first system and a second excitation winding and a second output winding as a second system such that a number of the teeth wound with the windings in the first system and a number of the teeth wound with the windings in the second system are equal to each other. The electric motor control device includes: a first voltage application unit which applies AC voltages for three phases to the first three-phase windings; a second voltage application unit which applies AC voltages for three phases to the second three-phase windings; a first current detector which detects current for each phase of the first three-phase windings; a second current detector which detects current for each phase of the second three-phase windings; and a controller which outputs AC voltage to be applied to the first excitation winding and AC voltage to be applied to the second excitation winding, calculates first voltage command values which are voltage command values for three phases in the first voltage application unit and outputs the first voltage command values to the first voltage application unit, and calculates second voltage command values which are voltage command values for three phases in the second voltage application unit and outputs the second voltage command values to the second voltage application unit. The controller is configured to: perform coordinate conversion of current values for three phases detected by the first current detector into a first d-axis current value and a first q-axis current value, and coordinate conversion of current values for three phases detected by the second current detector into a second d-axis current value and a second q-axis current value, using a corrected angle set as an average value of a first angle obtained from an output of the first system and a second angle obtained from an output of the second system of the resolver; calculate a first d-axis voltage command value so that a first d-axis current command value obtained from a first current command value inputted as a current command value for the first three-phase windings and the first d-axis current value coincide with each other, calculate a first q-axis voltage command value so that a first q-axis current command value obtained from the first current command value and the first q-axis current value coincide with each other, and perform coordinate conversion of the first d-axis voltage command value and the first q-axis voltage command value, using the corrected angle, to calculate the first voltage command values; and calculate a second d-axis voltage command value so that a second d-axis current command value obtained from a second current command value inputted as a current command value for the second three-phase windings and the second d-axis current value coincide with each other, calculate a second q-axis voltage command value so that a second q-axis current command value obtained from the second current command value and the second q-axis current value coincide with each other, and perform coordinate conversion of the second d-axis voltage command value and the second q-axis voltage command value, using the corrected angle, to calculate the second voltage command values.

Effect of the Invention

The electric motor control device according to the present disclosure makes it possible to provide an electric motor control device that can suppress ripple due to angle error even when eccentricity has occurred in a resolver.

DESCRIPTION OF EMBODIMENTS

Embodiment 1

Figure 1:
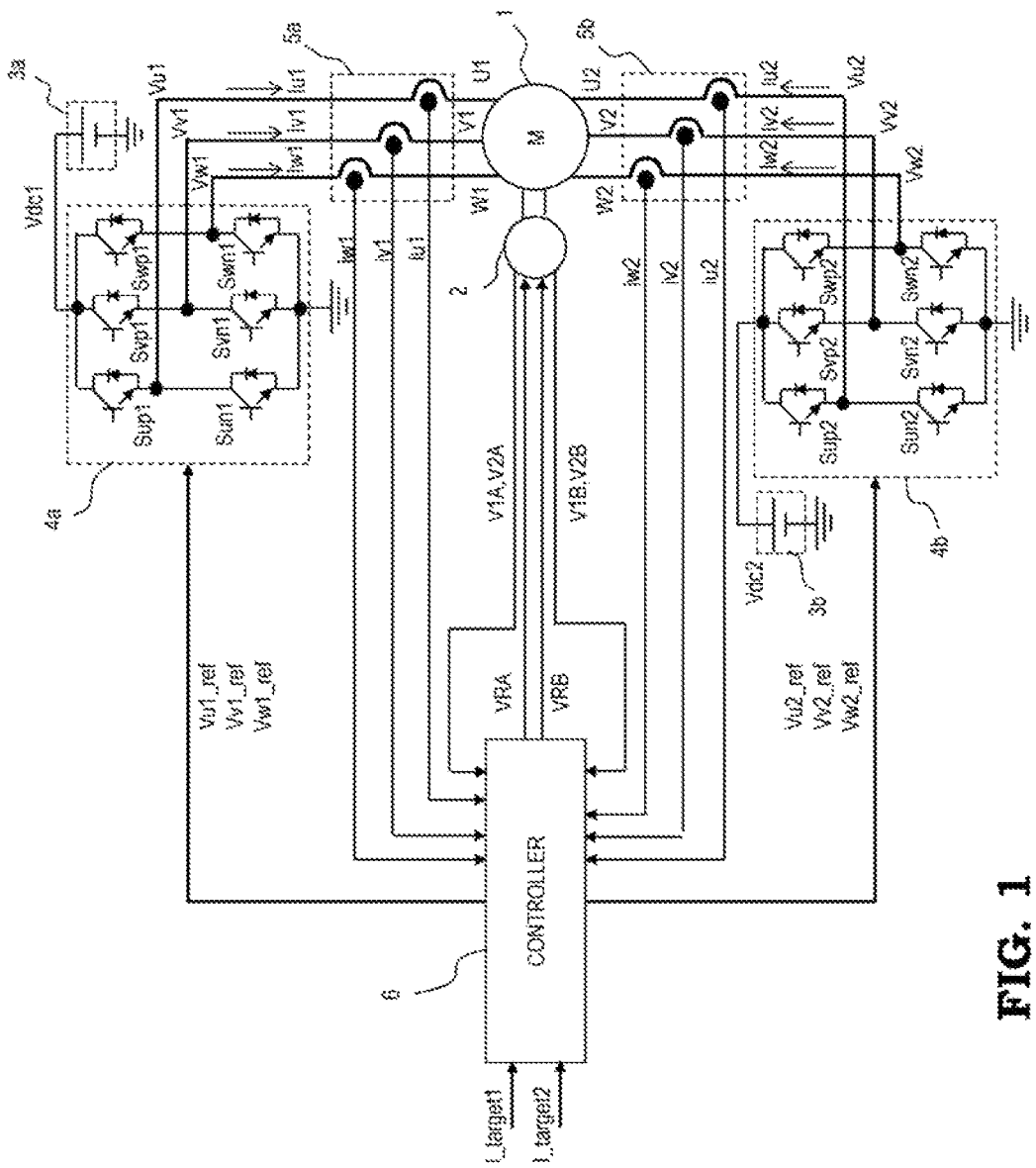
FIG. 1 is a block diagram showing the configuration of an electric motor control device according to embodiment 1.
Figure 2:
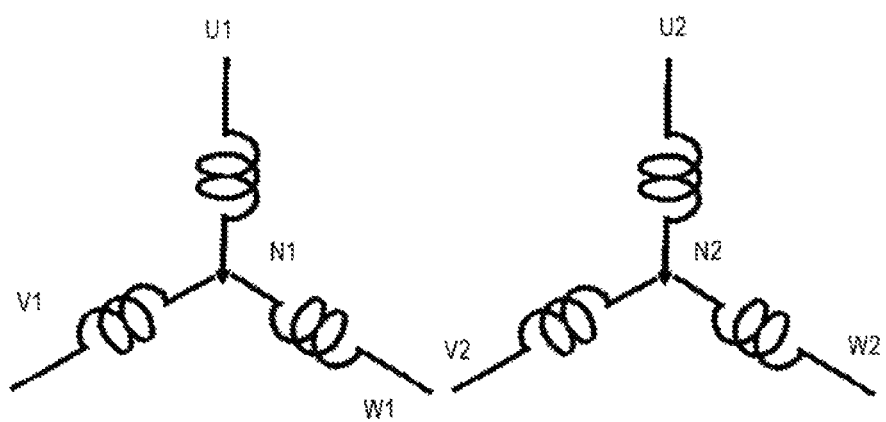
FIG. 2 shows an example of wire connection of windings of an AC electric motor which is a control target of the electric motor control device according to the present disclosure.

FIG. 1 is a block diagram of an electric motor control device according to embodiment 1. An AC electric motor 1 which is a control target is a permanent magnet synchronous rotary machine, a winding field synchronous rotary machine, an induction rotary machine, a synchronous reluctance motor, or the like, and has two sets of three-phase windings, i.e., first three-phase windings U1, V1, W1 and second three-phase windings U2, V2, W2. The first three-phase windings U1, V1, W1 and the second three-phase windings U2, V2, W2 are connected as shown in FIG. 2, for example. In FIG. 2, Y connection is shown as an example. However, Δ connection may be adopted. A phase difference may be provided between the first three-phase windings and the second three-phase windings.

Figure 3:
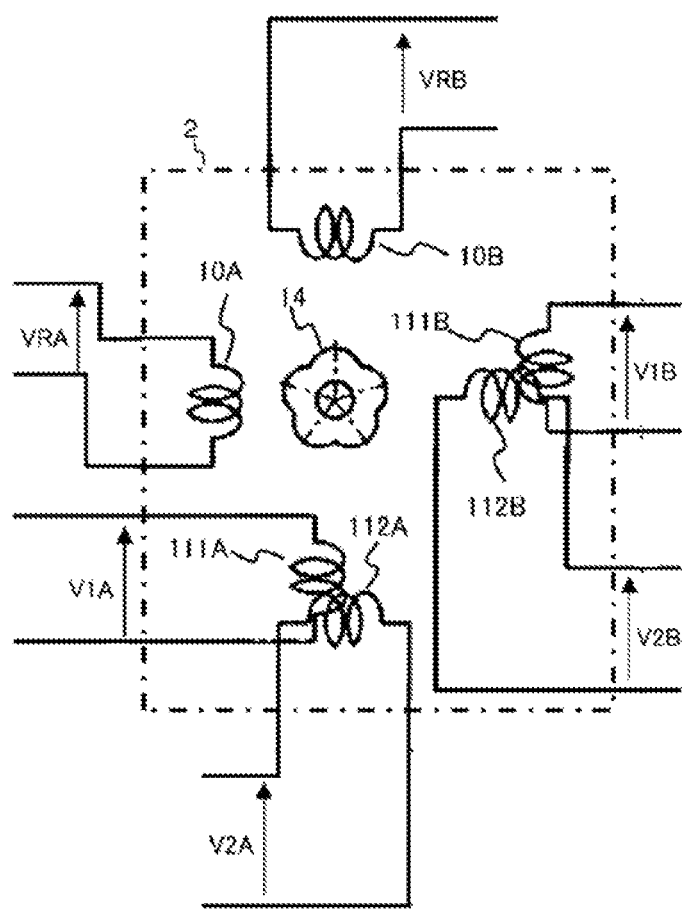
FIG. 3 is a conceptual diagram showing the configuration of a resolver used in the electric motor control device according to the present disclosure.

FIG. 3 is a conceptual diagram showing the configuration of a resolver 2 used in the electric motor control device according to the present disclosure. As shown in FIG. 3, the resolver 2 includes two systems, i.e., a first excitation winding 10A and two first output windings 111A, 112A as a first system, and a second excitation winding 10B and two second output windings 111B, 112B as a second system.

Figure 4:
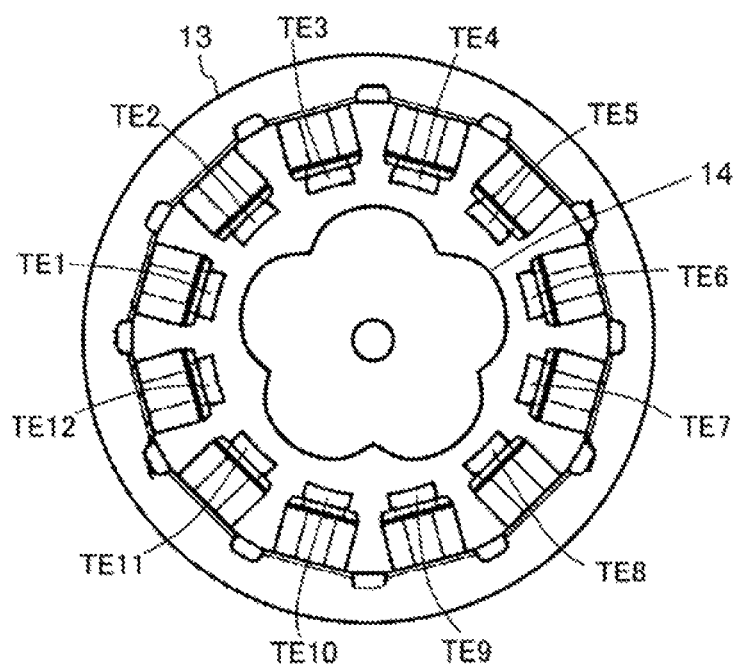
FIG. 4 is a structure view of the resolver used in the electric motor control device according to the present disclosure, as seen in the direction perpendicular to the axis.

FIG. 4 is a structure view of the resolver 2 as seen in the direction perpendicular to the axis. As shown in FIG. 4, in the resolver 2, teeth TE1 to TE12 are provided to the same stator 13, and the first excitation winding 10A, the two first output windings 111A, 112A, the second excitation winding 10B, and the two second output windings 111B, 112B are wound around the teeth TE1 to TE12. Here, the number of teeth wound with the windings in the first system and the number of teeth wound with the windings in the second system are set to be equal to each other. A rotor 14 is provided on the radially inner side of the stator 13. The rotor 14 has, on the outer circumference, a plurality of protrusions uniformly arranged in the circumferential direction. The protruding heights of the protrusions toward the radially outer side are set such that gap permeance between the stator 13 and the rotor 14 varies in a sine-wave shape through rotation. Such a resolver 2 is called a variable reluctance (VR) type resolver. In FIG. 4, a resolver having five protrusions with a shaft angle multiplier of 5 is shown as an example of the resolver 2. Thus, a resolver that makes five revolutions in electrical angle every time the rotor makes one revolution, will be described as an example.

Figure 5:
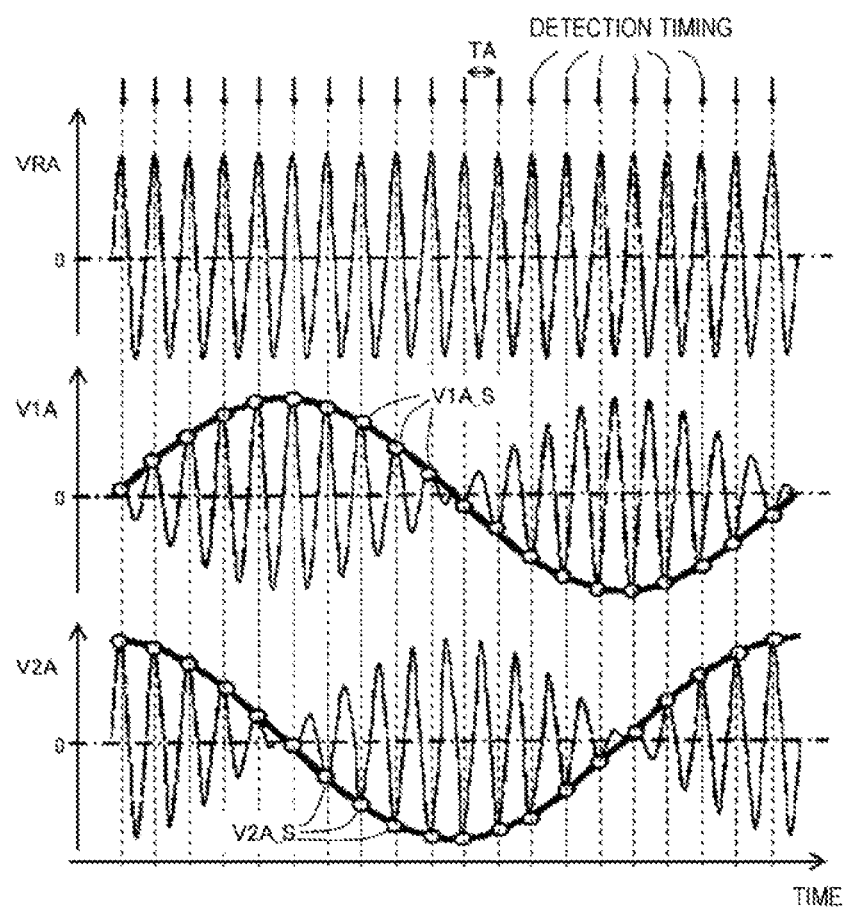
FIG. 5 illustrates operation of the resolver used in the electric motor control device according to the present disclosure.

FIG. 5 shows an example of operation of the resolver 2 under the assumption that there is no magnetic interference between the systems. In a state in which AC voltage VRA having a cycle TA is applied to the first excitation winding 10A, when the rotor rotates, the amplitude of an output signal V1A induced in the first output winding 111A and the amplitude of an output V2A induced in the first output winding 112A in accordance with the rotation angle (gap permeance) in electrical angle of the rotor vary in a sine-wave shape (or cosine-wave shape). The first output winding 111A and the first output winding 112A are wound at such circumferential-direction positions of the stator 13 that the amplitudes of AC voltages thereof are different from each other by 90 degrees in electrical angle. Similarly, the second output winding 111B and the second output winding 112B are wound at such circumferential-direction positions of the stator that the amplitudes of output signals V1B and V2B thereof are different from each other by 90 degrees in electrical angle.

The first excitation winding 10A wound around a plurality of teeth provided to the stator 13 is connected in series between the teeth, and a terminal of the first excitation winding 10A connected in series is connected to a controller 6 described later. Similarly, a terminal of the first output winding 111A connected in series between teeth is connected to the controller 6 described later. A terminal of another first output winding 112A connected in series between teeth is connected to the controller 6 described later. A terminal of the second excitation winding 10B connected in series is connected to the controller 6 described later. Similarly, a terminal of the second output winding 111B connected in series between teeth is connected to the controller 6 described later. A terminal of another second output winding 112B connected in series between teeth is connected to the controller 6 described later.

A DC power supply 3a outputs DC voltage Vdc1 to a first voltage application unit 4a. A DC power supply 3b outputs DC voltage Vdc2 to a second voltage application unit 4b. Each of these DC power supplies may be any DC power supply that outputs DC voltage, such as a battery, a DC-DC converter, a diode rectifier, or a PWM rectifier. Here, an example in which two DC power supplies 3a and 3b are used is shown. However, using one DC power supply, DC voltage Vdc outputted from the one DC power supply may be supplied to the first voltage application unit 4a and the second voltage application unit 4b.

The first voltage application unit 4a and the second voltage application unit 4b are each configured as an inverter that converts DC voltage to AC voltage. The first voltage application unit 4a undergoes PWM modulation through comparison with a PWM carrier wave having a frequency fc on the basis of first voltage command values Vu1_ref, Vv1_ref, Vw1_ref described later, to reversely convert the DC voltage Vdc1 inputted from the DC power supply 3a (conversion from DC to AC), and applies AC voltages Vu1, Vv1, Vw1 to the first three-phase windings U1, V1, W1 of the AC electric motor 1, respectively. Switches Sup1 to Swn1 of the inverter forming the first voltage application unit 4a are semiconductor switches such as IGBTs, bipolar transistors, or MOS power transistors, to which diodes are connected in antiparallel. The second voltage application unit 4b undergoes PWM modulation through comparison with a PWM carrier wave having a frequency fc on the basis of second voltage command values Vu2_ref, Vv2_ref, Vw2_ref described later, to reversely convert the DC voltage Vdc2 inputted from the DC power supply 3b (conversion from DC to AC), and supplies AC voltages Vu2, Vv2, Vw2 to the second three-phase windings U2, V2, W2 of the AC electric motor 1, respectively. Switches Sup2 to Swn2 of the inverter forming the second voltage application unit 4b are semiconductor switches such as IGBTs, bipolar transistors, or MOS power transistors, to which diodes are connected in antiparallel.

A first current detector 5a detects currents Iu1, Iv1, Iw1 respectively flowing through the first three-phase windings U1, V1, W1, and outputs the detected currents to the controller 6 described later. Similarly, a second current detector 5b detects currents Iu2, Iv2, Iw2 respectively flowing through the second three-phase windings U2, V2, W2, and outputs the detected currents to the controller 6 described later. Each of these current detectors may be a current detector of a known type such as a lower-arm shunt type or a bus single-shunt type.

The controller 6 receives a first current command value I_target1, the currents Iu1, Iv1, Iw1 detected by the first current detector 5a, and the output signal V1A from the first output winding 111A and the output signal V2A from the first output winding 112A of the resolver 2, and outputs the first voltage command values Vu1_ref, Vv1_ref, Vw1_ref to the first voltage application unit 4a. In addition, the controller 6 applies the AC voltage VRA to the first excitation winding 10A of the resolver 2. Further, the controller 6 receives a second current command value I_target2, the currents Iu2, Iv2, Iw2 detected by the second current detector 5b, and the output signal V1B from the second output winding 111B and the output signal V2B from the second output winding 112B of the resolver 2, and outputs the second voltage command values Vu2_ref, Vv2_ref, Vw2_ref to the second voltage application unit 4b. In addition, the controller 6 applies AC voltage VRB to the second excitation winding 10B of the resolver 2.

Figure 6:
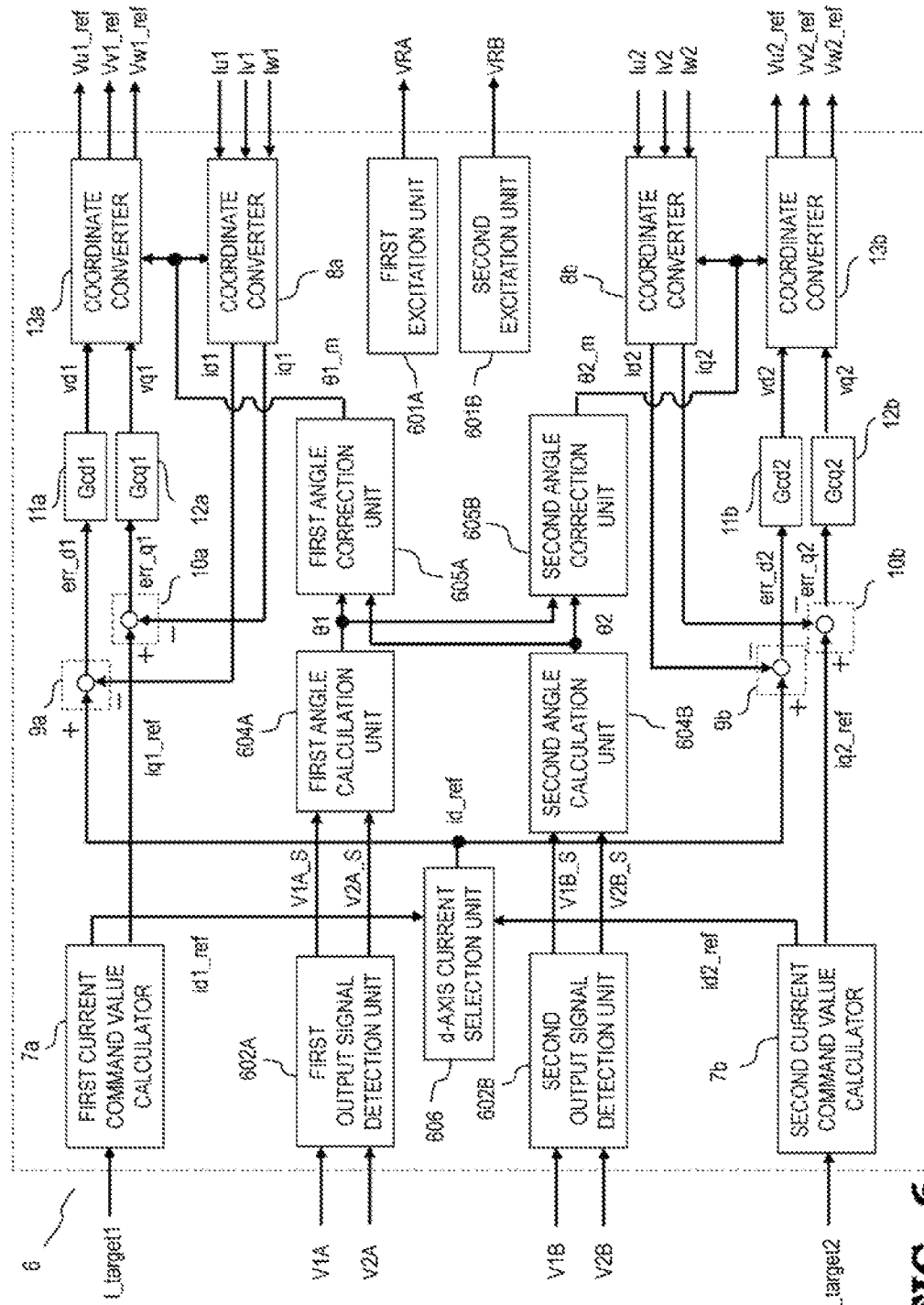
FIG. 6 is a block diagram showing the configuration of a controller of the electric motor control device according to embodiment 1.

Next, the configuration of the controller 6 will be described in detail with reference to FIG. 6. FIG. 6 is a block diagram showing calculation in the controller 6. A first excitation unit 601A applies the AC voltage VRA having a sine waveform with a cycle T to the first excitation winding 10A. Alternatively, the first excitation unit 601A may generate a rectangular-wave signal with the cycle T so as to output voltages having two values at "H" level (e.g., 5 V) and "L" level (e.g., 0 V) alternately, by a drive circuit, input the outputted signal to a low-pass filter circuit, and apply an output of the low-pass filter circuit as the AC voltage VRA. Similarly, the second excitation unit 601B applies the AC voltage VRB having a sine waveform with the same cycle and the same phase as the first excitation winding 10A, to the second excitation winding 10B. Alternatively, the second excitation unit 601B may generate a rectangular-wave signal with the cycle T so as to output voltages having two values at "H" level (e.g., 5 V) and "L" level (e.g., 0 V) alternately, by a drive circuit, input the outputted signal to a low-pass filter circuit, and apply an output of the low-pass filter circuit as the AC voltage VRB.

A first output signal detection unit 602A periodically detects the output signals V1A, V2A from the two first output windings 111A, 112A in the first system of the resolver 2, at predetermined detection timings (hereinafter, may be referred to as first detection timings) (see FIG. 5). Detected signals V1A_S, V2A_S are inputted to a first angle calculation unit 604A, and a first angle θ1 is obtained through calculation of Expression (1).

$$\theta1 = \arctan(V1A\_S/V2A\_S) \qquad (1)$$

A second output signal detection unit 602B periodically detects the output signals V1B, V2B from the two second output windings 111B, 112B in the second system of the resolver 2 at predetermined detection timings (hereinafter, may be referred to as second detection timings). Detected signals V1B_S, V2B_S are inputted to a second angle calculation unit 604B, and a second angle θ2 is obtained through calculation of Expression (2).

$$\theta2 = \arctan(V1B\_S/V2B\_S) \qquad (2)$$

A first angle correction unit 605A calculates an average value of the first angle θ1 and the second angle θ2, and outputs the average value as a first corrected angle θ1_m. A second angle correction unit 605B calculates an average value of the second angle θ2 and the first angle θ1, and outputs the average value as a second corrected angle θ2_m. That is, the first corrected angle and the second corrected angle are the same corrected angle θ1_m=θ2_m=(θ1+θ2)/2.

The effects of the first angle correction unit 605A and the second angle correction unit 605B will be described later. A first current command value calculator 7a calculates a first q-axis current command value iq1_ref on q axis and a first d-axis current command value candidate id1_ref on d axis for applying currents to the first three-phase windings of the AC electric motor 1, on the basis of the first current command value I_target1. The first current command value calculator 7a may substitute values as id1_ref=0 and iq1_ref=I_target1, may perform calculation using known field weakening control, may perform calculation on the basis of known max torque per ampere (MTPA) control, or may use another known calculation method for dq-axis current commands A second current command value calculator 7b calculates a second q-axis current command value iq2_ref on q axis and a second d-axis current command value candidate id2_ref on d axis for applying currents to the second three-phase windings of the AC electric motor 1, on the basis of the second current command value I_target2. The second current command value calculator 7b may substitute values as id2_ref=0 and iq2_ref=I_target2, may perform calculation using known field weakening control, may perform calculation on the basis of known max torque per ampere (MTPA) control, or may use another known calculation method for dq-axis current commands.

A d-axis current selection unit 606 receives the first d-axis current command value candidate id1_ref which is an output value from the first current command value calculator 7a and the second d-axis current command value candidate id2_ref which is an output value from the second current command value calculator 7b. The d-axis current selection unit 606 selects either of id1_ref or id2_ref and outputs the selected one as a d-axis current command value id_ref. As a selection method, the one having the greater absolute value may be selected, or another selection method may be used.

A coordinate converter 8a performs coordinate conversion of the currents Iu1, Iv1, Iw1 flowing through the first three-phase windings and detected by the first current detector 5a, using the first corrected angle θ1_m outputted from the first angle correction unit 605A, to obtain a first d-axis current value id1 and a first q-axis current value iq1 which are currents on rotating two axes (d-q axes). A coordinate converter 8b performs coordinate conversion of the currents Iu2, Iv2, Iw2 flowing through the second three-phase windings and detected by the second current detector 5b, using the second corrected angle θ2_m outputted from the second angle correction unit 605B, to obtain a second d-axis current value id2 and a second q-axis current value iq2 which are currents on rotating two axes (d-q axes).

A subtractor 9a subtracts the first d-axis current value id1 from the d-axis current command value id_ref, and outputs a deviation err_d1. A subtractor 10a subtracts the first q-axis current value iq1 from the first q-axis current command value iq1_ref, and outputs a deviation err_q1. A subtractor 9b subtracts the second d-axis current value id2 from the d-axis current command value id_ref, and outputs a deviation err_d2. A subtractor 10b subtracts the second q-axis current value iq2 from the second q-axis current command value iq2_ref, and outputs a deviation err_q2.

A current controller 11a calculates a first d-axis voltage command value vd1 on rotating two axes (d-q axes) through proportional integral control so that err_d1 obtained from the subtractor 9a coincides with zero, i.e., the d-axis current command value id_ref and the first d-axis current value id1 coincide with each other. A current controller 12a calculates a first q-axis voltage command value vq1 on rotating two axes (d-q axes) through proportional integral control so that err_q1 obtained from the subtractor 10a coincides with zero, i.e., the first q-axis current command value iq1_ref and the first q-axis current value iq1 coincide with each other. A current controller 11b calculates a second d-axis voltage command value vd2 on rotating two axes (d-q axes) through proportional integral control so that err_d2 obtained from the subtractor 9b coincides with zero, i.e., the d-axis current command value id_ref and the second d-axis current value id2 coincide with each other. A current controller 12b calculates a second q-axis voltage command value vq2 on rotating two axes (d-q axes) through proportional integral control so that err_q2 obtained from the subtractor 10b coincides with zero, i.e., the second q-axis current command value iq2_ref and the second q-axis current value iq2 coincide with each other.

A coordinate converter 13a performs coordinate conversion of the first d-axis voltage command value vd1 and the first q-axis voltage command value vq1 on rotating two axes (d-q axes), using the first corrected angle $\theta 1\_m$, to calculate the three-phase voltage command values Vu1_ref, Vv1_ref, Vw1_ref to be outputted to the first voltage application unit 4a. A coordinate converter 13b performs coordinate conversion of the second d-axis voltage command value vd2 and the second q-axis voltage command value vq2 on rotating two axes (d-q axes), using the second corrected angle $\theta 2\_m$, to calculate the three-phase voltage command values Vu2_ref, Vv2_ref, Vw2_ref to be outputted to the second voltage application unit 4b.

Figure 7A:
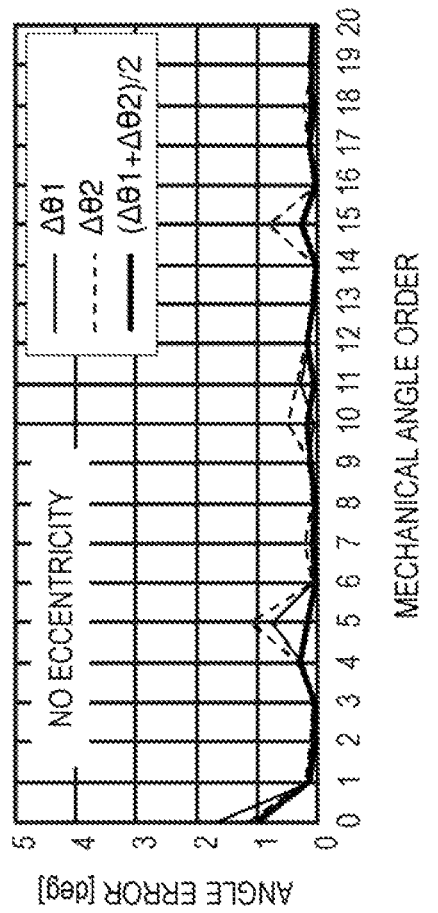
FIG. 7A and FIG. 7B show angle errors of the resolver, for illustrating operation of the electric motor control device according to embodiment 1.
Figure 7B:
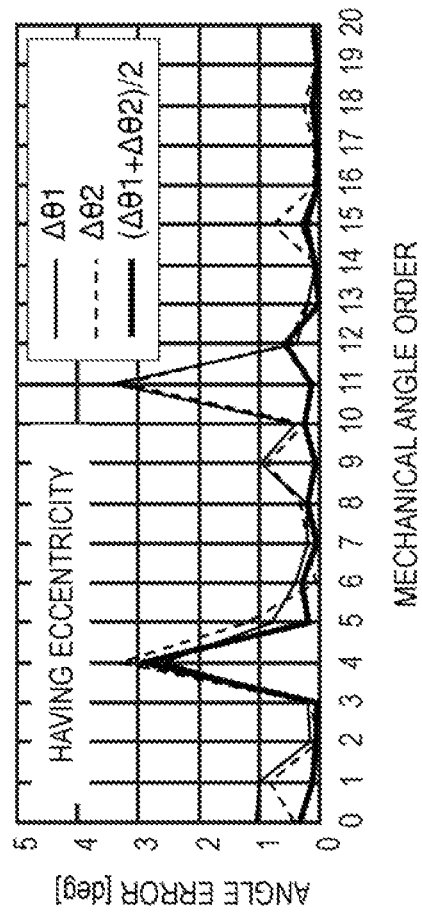

Hereinafter, the reason why torque ripple due to angle error caused by eccentricity of the resolver can be suppressed in the present embodiment will be described. FIG. 7A and FIG. 7B show results of performing frequency analysis (FFT) on angle error of each of the first angle $\theta 1$, the second angle $\theta 2$, and the average value of $\theta 1$ and $\theta 2$, in a case of having no eccentricity and a case of having eccentricity, respectively. The vertical axis indicates angle error and the horizontal axis indicates mechanical angle order. In the case of having eccentricity, the angle errors of the first angle $\theta 1$ and the second angle $\theta 2$ are greater at the first, fourth, ninth, and eleventh orders in mechanical angle than in the case of having no eccentricity. On the other hand, the angle error of the average value of $\theta 1$ and $\theta 2$ is small at the first, ninth, and eleventh orders, though being great at the fourth order. It is considered that, at the first, ninth, and eleventh orders at which error of the average value of $\theta 1$ and $\theta 2$ is small, $\theta 1$ and $\theta 2$ have angle errors with the same magnitude and opposite signs and therefore the angle errors are canceled by each other in the average value of $\theta 1$ and $\theta 2$ so as to become small. In the resolver having two systems, if the numbers of teeth wound in the respective systems are equal to each other, there are mechanical angle order components at which the angle error of the first angle $\theta 1$ and the angle error of the second angle $\theta 2$ have the same magnitude and opposite signs, depending on eccentricity of the resolver. Hereinafter, focusing on the orders at which $\theta 1$ and $\theta 2$ have angle errors with the same magnitude and opposite signs as described above, a configuration for suppressing torque ripple caused by the angle errors at such orders will be described.

When $\theta 1$ and $\theta 2$ have angle errors with the same magnitude and opposite signs, $\theta 1$ and $\theta 2$ are represented by Expression (3) and Expression (4).

$$\theta 1 = \theta + \Delta\theta \quad (3)$$

$$\theta 2 = \theta - \Delta\theta \quad (4)$$

Here, $\theta$ is a true angle and $\Delta\theta$ is angle error. The first angle correction unit 605A calculates the first corrected angle $\theta 1\_m$ by Expression (5) using $\theta 1$ and $\theta 2$.

$$\theta 1\_m = 0.5 \times (\theta 1 + \theta 2) \quad (5)$$

Through calculation of Expression (5), the angle errors $\Delta\theta$ are canceled out and $\theta 1\_m$ coincides with the value of the true angle $\theta$. Similarly, the second angle correction unit 605B also calculates the second corrected angle $\theta 2\_m$ by Expression (6) using $\theta 2$ and $\theta 1$.

$$\theta 2\_m = 0.5 \times (\theta 2 + \theta 1) \quad (6)$$

Through calculation of Expression (6), the angle errors $\Delta\theta$ are canceled out and $\theta 2\_m$ coincides with the value of the true angle $\theta$. Thus, through such angle correction as to cancel the angle errors $\Delta\theta$ by each other, it becomes possible to suppress torque ripple due to the angle error $\Delta\theta$.

In a case where the angle error $\Delta\theta$ is an AC quantity that varies with time, if the first detection timing of detecting $\theta 1$ and the second detection timing of detecting $\theta 2$ differ from each other, the angle errors $\Delta\theta$ might not be canceled by each other through correction by Expression (5) and Expression (6). This is because the magnitudes of the angle error at the timing of detecting $\theta 1$ and the angle error at the timing of detecting $\theta 2$ are different from each other. A method for suppressing torque ripple due to angle error in such a case will be described. First, $\theta 1$ will be discussed. In $\theta 1$, the angle error of $+\Delta\theta$ is superimposed on the true angle $\theta$. It is noted that the sign of $\Delta\theta$ may be either positive or negative. Here, axes obtained by performing dq conversion using $\theta 1$ are defined as dc1-qc1 axes. The dc1-qc1 axes mean that the angle is shifted by $\Delta\theta$ relative to the true d-q axes. At this time, current id_c1 flowing by a command on dc1 axis has a true q-axis component. The current having the true q-axis component contributes to torque, and therefore, when id_c1×sin($\Delta\theta$) which is a q-axis component of id_c1 occurs as q-axis current error $\Delta iq1$, torque ripple occurs. Also current iq_c1 flowing by a command on qc1 axis has error relative to the true q-axis component, but the magnitude of the error is iq_c1×(1−cos($\Delta\theta$)) and therefore the influence thereof is almost negligible when $\Delta\theta$ is small. Meanwhile, a true d-axis component of iq_c1 less contributes to torque than the true q-axis component of id_c1 and therefore is not considered here.

Next, $\theta 2$ will be discussed. In $\theta 2$, angle error of $-\Delta\theta$ is superimposed on the true angle $\theta$. Here, axes obtained by performing dq conversion using $\theta 2$ are defined as dc2-qc2 axes. The dc2-qc2 axes mean that the angle is shifted by $-\Delta\theta$ relative to the true d-q axes. At this time, current id_c2 flowing by a command on dc2 axis has a true q-axis component. This component is represented as id_c2×sin($-\Delta\theta$) and occurs as q-axis current error $\Delta iq2$, thus causing torque ripple. In the same manner as in the dc1-qc1 axes, the influence of a true q-axis component of current iq_c2 flowing by a command on qc2 axis is almost negligible when the angle error is small. Meanwhile, a true d-axis component of iq_c2 less contributes to torque than the true q-axis component of id_c2 and therefore is not considered here.

From the above, the q-axis current error which significantly contributes to torque is the sum of Δiq1 and Δiq2. Here, the sum of Δiq1 and Δiq2 is calculated as shown by Expression (7).

$$\Delta iq1 + \Delta iq2 = (id\_c1 - id\_c2)\sin(\Delta\theta) \quad (7)$$

In Expression (7), it is found that the q-axis current error can be made zero by setting id_c1 and id_c2 at the same value. Therefore, it is possible to suppress torque ripple by setting id_c1 and id_c2 at the same value. Thus, by making the d-axis current command value for the first three-phase windings and the d-axis current command value for the second three-phase windings equal to each other by the d-axis current selection unit 606, it becomes possible to suppress torque ripple due to the angle error Δθ.

As described above, in a case where difference between the first detection timing and the second detection timing is small enough that the difference does not become a problem, torque ripple due to eccentricity of the resolver can be reduced through angle correction by the first angle correction unit 605A and the second angle correction unit 605B. On the other hand, in a case where there might be some difference between the first detection timing and the second detection timing, torque ripple due to eccentricity of the resolver can be reduced by setting the d-axis current command value for the first three-phase windings and the d-axis current command value for the second three-phase windings at the same value.

As a matter of course, also in the case where angle error correction by the first angle correction unit 605A and the second angle correction unit 605B is effective, the d-axis current command value for the first three-phase windings and the d-axis current command value for the second three-phase windings may be made to coincide with each other by the d-axis current selection unit. In this way, by executing at least one of control using the average value of θ1 and θ2 as the corrected angle for coordinate conversion and control using the same value as the d-axis current command values, it is possible to reduce torque ripple due to eccentricity of the resolver.

Embodiment 2

Figure 8:
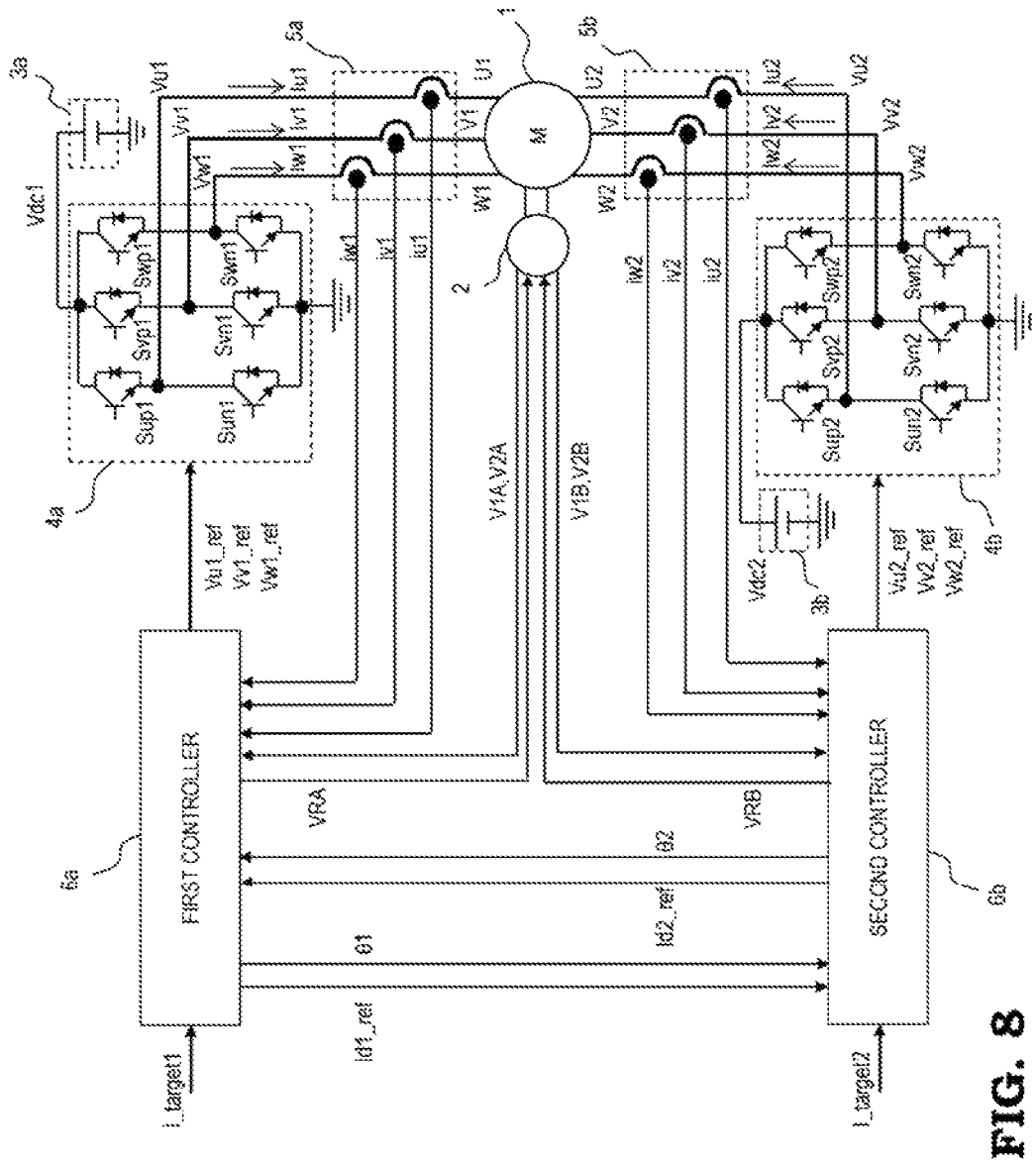
FIG. 8 is a block diagram showing the configuration of an electric motor control device according to embodiment 2.

FIG. 8 is a block diagram of an electric motor control device according to embodiment 2. Description of the same parts as those in embodiment 1 is omitted. Embodiment 2 is different from embodiment 1 in that, as the controller, two controllers, i.e., a first controller 6a and a second controller 6b, are provided.

The first controller 6a receives the first current command value I_target1, the currents Iu1, Iv1, Iw1 detected by the first current detector 5a, and the output signal V1A from the first output winding 111A and the output signal V2A from the first output winding 112A of the resolver 2, and outputs the first voltage command values Vu1_ref, Vv1_ref, Vw1_ref to the first voltage application unit 4a configured as an inverter. In addition, the first controller 6a applies the AC voltage VRA having a first cycle TA to the first excitation winding 10A of the resolver 2.

The second controller 6b receives the second current command value I_target2, the currents Iu2, Iv2, Iw2 detected by the second current detector 5b, and the output signal V1B for the second output winding 111B and the output signal V2B for the second output winding 112B of the resolver 2, and outputs the second voltage command values Vu2_ref, Vv2_ref, Vw2_ref to the second voltage application unit 4b configured as an inverter. In addition, the second controller 6b applies the AC voltage VRB having a second cycle TB different from the first cycle TA, to the second excitation winding 10B of the resolver 2. Here, the relationship between the first cycle TA and the second cycle TB is assumed to be TB=2×TA.

Figure 9:
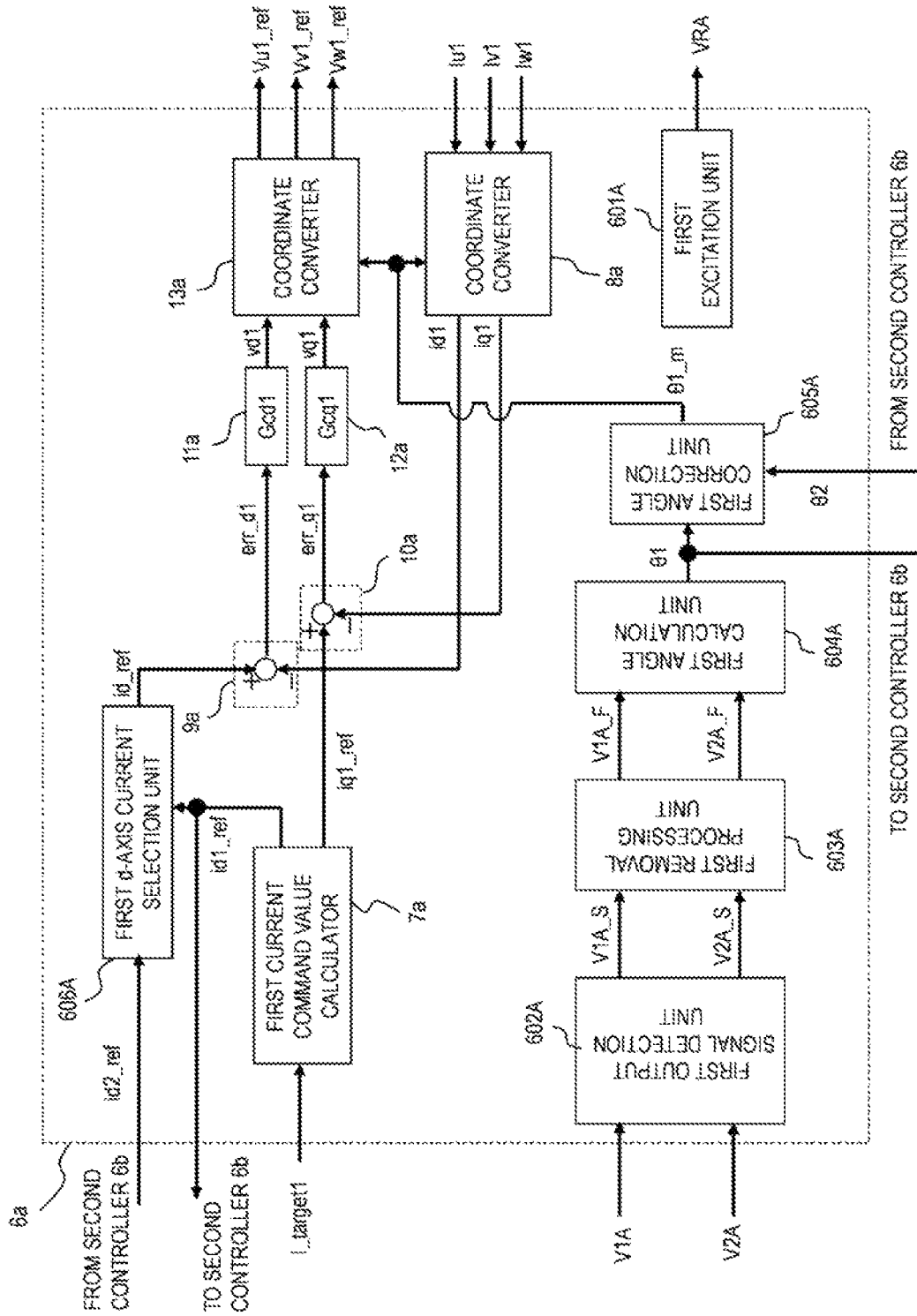
FIG. 9 is a block diagram showing the configuration of a first controller of the electric motor control device according to embodiment 2.

FIG. 9 is a block diagram showing calculation in the first controller 6a. The first excitation unit 601A applies the AC voltage VRA (in this example, AC voltage VRA having a sine waveform) having the first cycle TA, to the first excitation winding 10A. Alternatively, the first excitation unit 601A may generate a rectangular-wave signal having the first cycle TA so as to output voltages having two values at "H" level (e.g., 5 V) and "L" level (e.g., 0 V) alternately, by a drive circuit, input the outputted signal to a low-pass filter circuit, and apply an output of the low-pass filter circuit as the AC voltage VRA.

The first output signal detection unit 602A periodically detects the output signals V1A, V2A from the two first output windings 111A, 112A, at predetermined detection timings (hereinafter, may be referred to as first detection timings).

Figure 10:
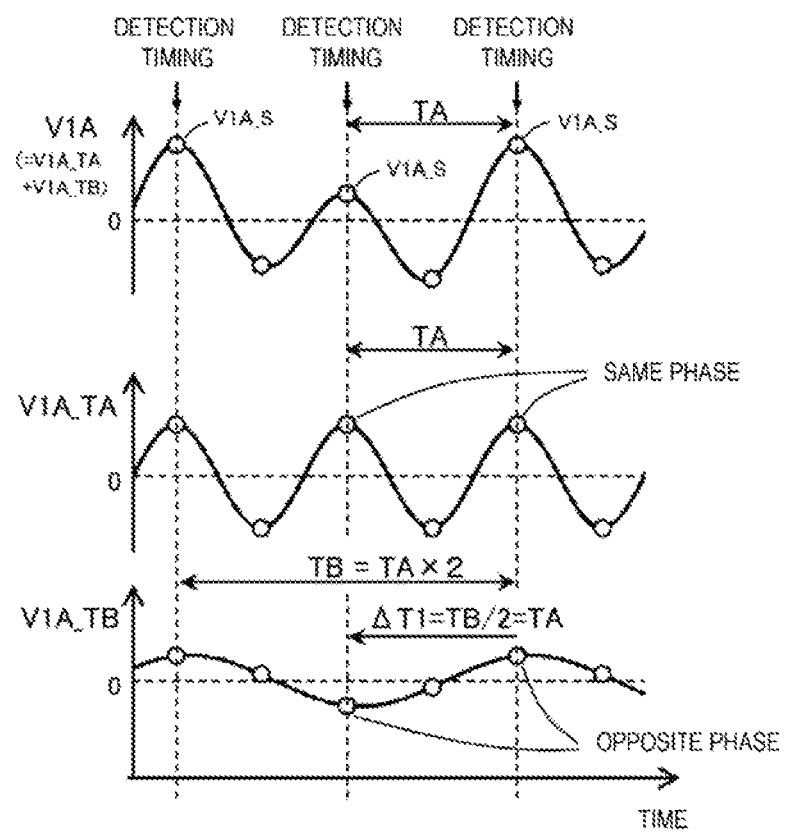
FIG. 10 shows an output signal of the resolver, for illustrating operation of the first controller of the electric motor control device according to embodiment 2.

Here, magnetic interference between the first output winding and the second output winding of the resolver 2 will be described. On the output signals V1A, V2A from the two first output windings 111A, 112A, second-cycle components V1A_TB, V2A_TB induced by a magnetic flux having the second cycle TB excited at the second excitation winding 10B are respectively superimposed due to magnetic interference between the systems. FIG. 10 shows the output signal from the first output winding 111A. In FIG. 10, a graph at the upper stage indicates the output signal V1A from the first output winding 111A, a graph at the middle stage indicates a component V1A_TA having the first cycle TA contained in the output signal V1A from the first output winding 111A and induced by the magnetic flux of the first excitation winding 10A, and a graph at the lower stage indicates the component V1A_TB having the second cycle TB contained in the output signal V1A from the first output winding 111A and induced by the magnetic flux of the second excitation winding 10B. The output signal V1A from the first output winding 111A corresponds to the sum of the first-cycle component V1A_TA and the second-cycle component V1A_TB.

Figure 11B:
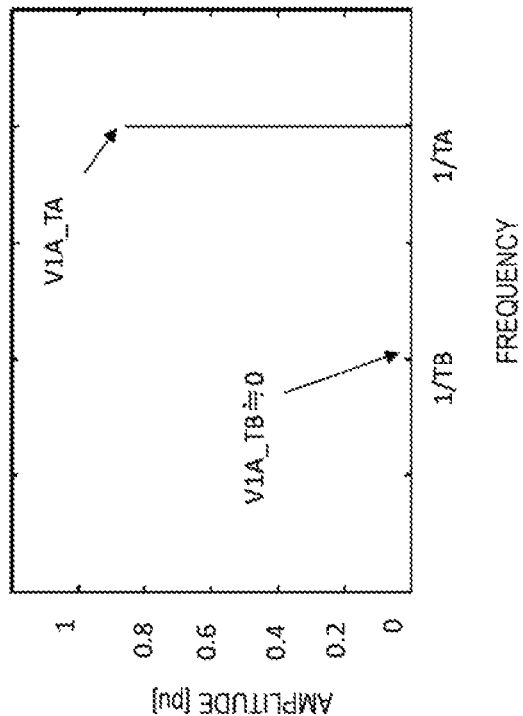
FIG. 11A and FIG. 11B show results of frequency analysis on the output signal of the resolver, for illustrating operation of the first controller of the electric motor control device according to embodiment 2.
Figure 11A:
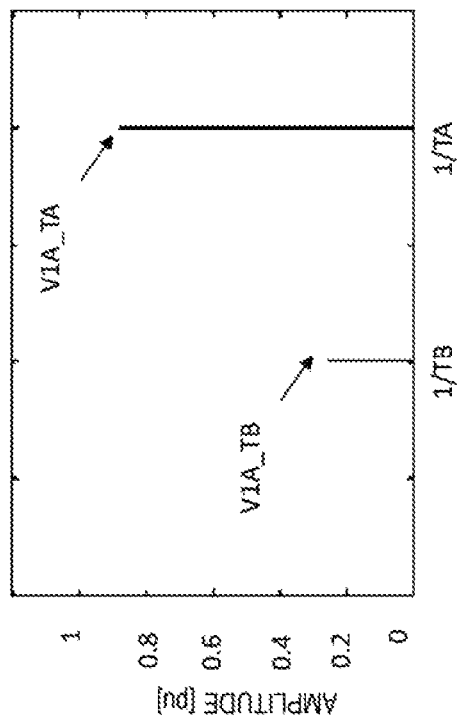

Here, FIG. 11A and FIG. 11B show results of frequency analysis based on actual measurement of the output signal V1A from the first output winding 111A. As a condition for the actual measurement test, TA is set at 50 us and TB is set at 100 us. In FIG. 11A and FIG. 11B, the horizontal axis indicates the frequency and the vertical axis indicates the amplitude of the output signal. FIG. 11A shows a case where AC voltage having the cycle TB is applied to the second excitation winding 10B, and in the output signal V1A, V1A_TB due to the AC voltage having the cycle TB applied to the second excitation winding 10B is superimposed as interference voltage on V1A_TA due to the AC voltage having the cycle TA applied to the first excitation winding 10A. On the other hand, FIG. 11B shows a case where the AC voltage having the cycle TB is not applied to the second excitation winding 10B, and the component V1A_TB having the cycle TB contained in the output signal V1A is almost zero. The same applies to V2A, V2A_TA, and V2A_TB.

Thus, when the angle is calculated using the signals containing V1A_TB, V2A_TB, detection error occurs.

Therefore, in order to suppress the angle detection error, it is necessary to remove the second-cycle component V1A_TB from the output signal V1A of the first output winding in the first system. Accordingly, a first removal processing unit 603A performs second-cycle component removing processing for removing (reducing) the component having the second cycle TB, on the detected values V1A_S, V2A_S of the output signals from the two first output windings. Then, the first angle calculation unit 604A calculates the first angle θ1 on the basis of detected values V1A_F, V2A_F of the output signals from the two first output windings that have undergone the second-cycle component removing processing.

In the present embodiment, the second-cycle component removing processing is performed on the basis of the principle described below. As shown in the graph at the lower stage in FIG. 10, the phase of the second-cycle component V1A_TB of the output signal from the first output winding is reversed at a cycle (e.g., a half cycle TB/2 of the second cycle) obtained by adding an integer multiple of the second cycle TB to the half cycle TB/2 of the second cycle, and thus the plus/minus sign of the value of V1A_TB is reversed. Accordingly, as the second-cycle component removing processing, the first removal processing unit 603A adds the detected values V1A_S, V2A_S of the output signals from the two first output windings detected at the present detection timing, and detected values V1A_Sold, V2A_Sold of the output signals from the two output windings in the first system detected at a detection timing earlier than the present detection timing by a first removal processing interval ΔT1. The first removal processing interval ΔT1 is set as shown by Expression (8). Here, M is an integer not less than 0. In the present embodiment, M is set at 0, and thus the first removal processing interval ΔT1 is set at the half cycle TB/2 of the second cycle.

$$\Delta T1 = TB/2 + TB \times M \quad (8)$$

Figure 12:
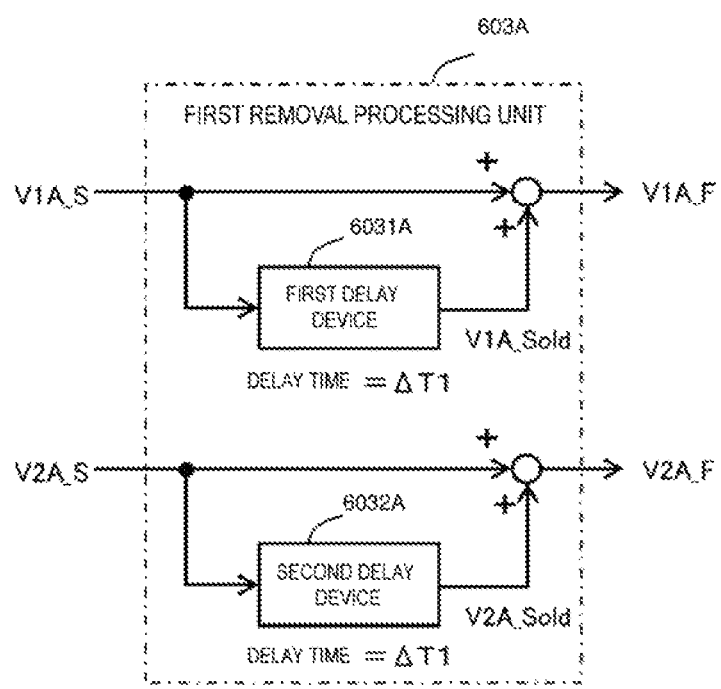
FIG. 12 is a block diagram showing the configuration of a first removal processing unit of the first controller of the electric motor control device according to embodiment 2.

The first removal processing unit 603A is configured as shown in FIG. 12, for example. The first removal processing unit 603A includes a first delay device 6031A which outputs the detected value V1A_S of the output signal from the first output winding with a delay by the first removal processing interval ΔT1, and adds the detected value V1A_S of the output signal from the first output winding and the output V1A_Sold of the first delay device 6031A, to calculate the detected value V1A_F of the output signal from the first output winding that has undergone the second-cycle component removing processing. Similarly, the first removal processing unit 603A includes a second delay device 6032A which outputs the detected value V2A_S of the output signal from the first output winding with a delay by the first removal processing interval AT1, and adds the detected value V2A_S of the output signal from the first output winding and the output V2A_Sold of the second delay device 6032A, to calculate a detected value V2A_F of the output signal from the first output winding that has undergone the second-cycle component removing processing.

The first angle calculation unit 604A is configured to calculate the first angle θ1 on the basis of the detected values V1A_F, V2A_F of the output signals from the two first output windings 111A, 112A after the addition. With this configuration, two second-cycle components having plus/minus signs opposite to each other are added, whereby the two second-cycle components are canceled by each other. Thus, in the detected values V1A_F, V2A_F of the output signals from the two first output windings after the addition, the second-cycle components have been removed. Then, on the basis of the detected values from which the second-cycle components have been removed, the first angle θ1 can be accurately calculated.

In the present embodiment, the first angle calculation unit 604A calculates an arctangent of the ratio between the detected value V1A_F of the output signal from the first output winding 111A and the detected value V2A_F of the output signal from the first output winding 112A that have undergone the second-cycle component removing processing, as shown by Expression (9), thus calculating the first angle θ1.

$$\theta 1 = \arctan(V1A\_F/V2A\_F) \quad (9)$$

The first angle θ1 is communicated to the second controller 6b by CPU communication. The first angle correction unit 605A receives the first angle θ1 and the second angle θ2 which is a signal communicated from the second controller 6b described later. The first angle correction unit 605A calculates the average value of θ1 and θ2 and outputs the average value as the first corrected angle θ1_m.

Next, the first current command value calculator 7a calculates the first q-axis current command value iq1_ref on q axis and the first d-axis current command value candidate id1_ref on d axis for applying currents to the first three-phase windings of the AC electric motor 1, on the basis of the first current command value I_target1. The first current command value calculator 7a may substitute values as id1_ref=0 and iq1_ref=I_target1, may perform calculation using known field weakening control, may perform calculation on the basis of known max torque per ampere (MTPA) control, or may use another known calculation method for dq-axis current commands The first d-axis current command value candidate id1_ref for applying currents to the first three-phase windings is communicated to the second controller 6b by CPU communication.

The first d-axis current selection unit 606A receives the first d-axis current command value candidate id1_ref which is an output value from the first current command value calculator 7a and the second d-axis current command value candidate id2_ref which is a signal communicated from the second controller 6b described later. The first d-axis current selection unit 606A selects either id1_ref or id2_ref and outputs the selected one as the d-axis current command value id_ref. As a selection method, the one having the greater absolute value may be selected or the one having the smaller absolute value may be selected.

The coordinate converter 8a performs coordinate conversion of the currents Iu1, Iv1, Iw1 flowing through the first three-phase windings and detected by the first current detector 5a, using the first corrected angle θ1_m outputted from the first angle correction unit 605A, to obtain the first d-axis current value id1 and the first q-axis current value iq1 which are currents on rotating two axes (d-q axes).

The subtractor 9a subtracts the first d-axis current value id1 from the d-axis current command value id_ref, and outputs the deviation err_d1. The subtractor 10a subtracts the current iq1 from the first q-axis current command value iq1_ref, and outputs the deviation err_q1. The current controller 11a calculates the first d-axis voltage command value vd1 on rotating two axes (d-q axes) through proportional integral control so that err_d1 obtained from the subtractor 9a coincides with zero. The current controller 12a calculates the first q-axis voltage command value vq1 on rotating two axes (d-q axes) through proportional integral control so that err_q1 obtained from the subtractor 10a coincides with zero. The coordinate converter 13a performs coordinate conversion of the first d-axis voltage command value vd1 and the first q-axis voltage command value vq1 on rotating two axes (d-q axes), using the first corrected angle θ1_m, to obtain the first voltage command values Vu1_ref, Vv1_ref, Vw1_ref.

Figure 13:
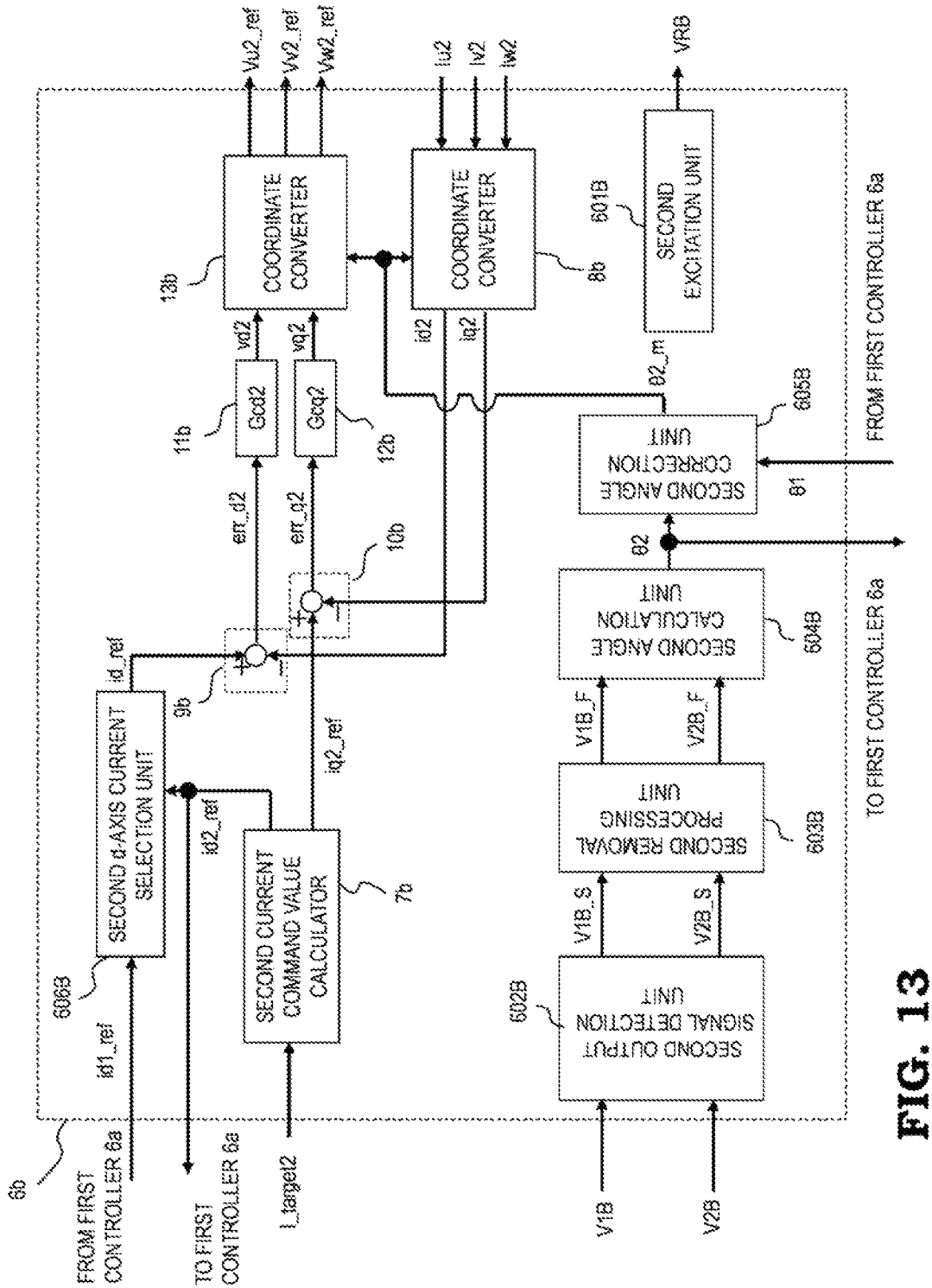
FIG. 13 is a block diagram showing the configuration of a second controller of the electric motor control device according to embodiment 2.

Next, the second controller 6b will be described. FIG. 13 is a block diagram showing calculation in the second controller 6b. The second excitation unit 601B applies the AC voltage VRB having a sine waveform with the second cycle TB, to the second excitation winding 10B. Alternatively, the second excitation unit 601B may generate a rectangular-wave signal having the second cycle TB so as to output voltages having two values at "H" level (e.g., 5 V) and "L" level (e.g., 0 V) alternately, by a drive circuit, input the outputted signal to a low-pass filter circuit, and apply an output of the low-pass filter circuit as the AC voltage VRB.

The second output signal detection unit 602B periodically detects the output signals V1B, V2B from the two second output windings 111B, 112B at predetermined detection timings (hereinafter, may be referred to as second detection timings).

Figure 14:
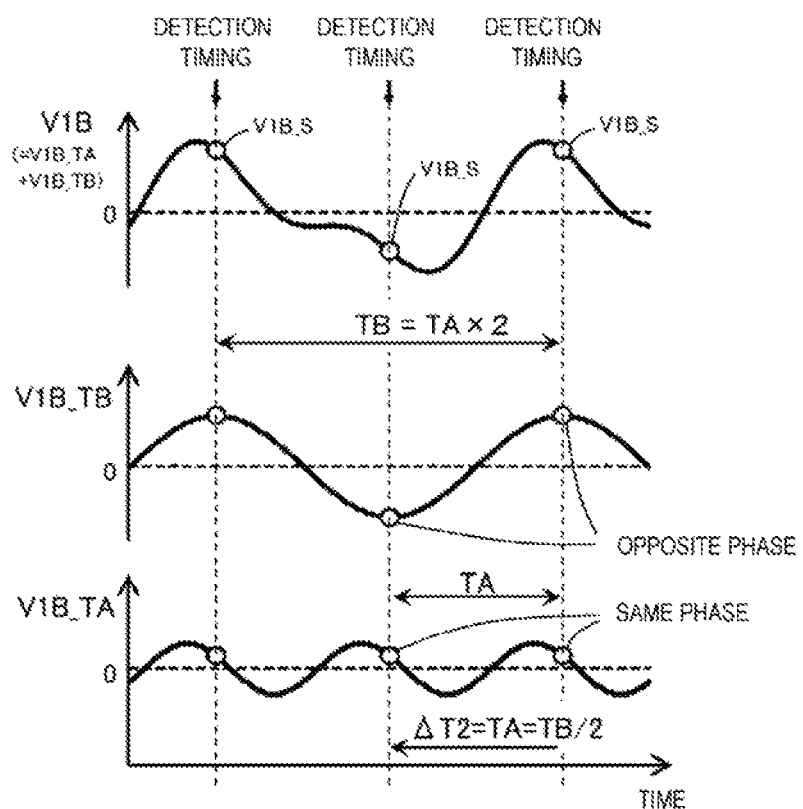
FIG. 14 shows an output signal of the resolver, for illustrating operation of the second controller of the electric motor control device according to embodiment 2.

As previously described, magnetic interference occurs between the first output winding and the second output winding of the resolver 2. FIG. 14 shows the output signal V1B from the second output winding 111B. On the output signals V1B, V2B from the two second output windings 111B, 112B, first-cycle components V1B_TA, V2B_TA induced by a magnetic flux having the first cycle TA excited at the first excitation winding 10A are respectively superimposed due to magnetic interference between the systems. In FIG. 14, a graph at the upper stage indicates the output signal V1B from the second output winding 111B, a graph at the middle stage indicates a component V1B_TB having the second cycle TB contained in the output signal V1B from the second output winding 111B and induced by the magnetic flux of the second excitation winding 10B, and a graph at the lower stage indicates the component V1B_TA having the first cycle TA contained in the output signal V1B from the second output winding 111B and induced by the magnetic flux of the first excitation winding 10A. The output signal V1B from the second output winding corresponds to the sum of the second-cycle component V1B_TB and the first-cycle component V1B_TA.

Figure 15A:
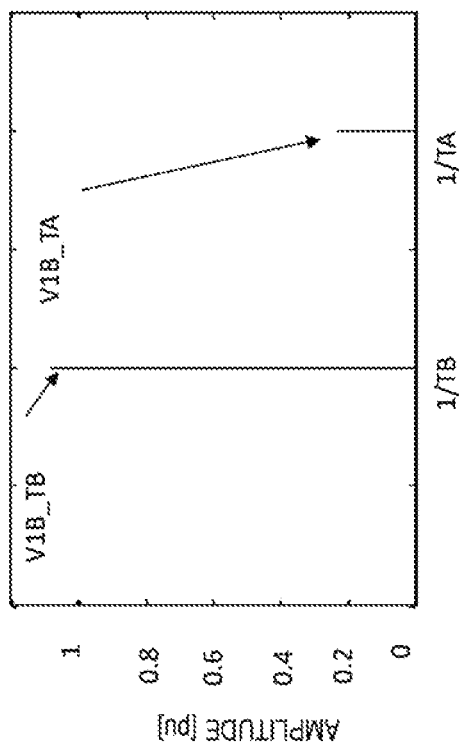
FIG. 15A and FIG. 15B show results of frequency analysis on the output signal of the resolver, for illustrating operation of the second controller of the electric motor control device according to embodiment 2.
Figure 15B:
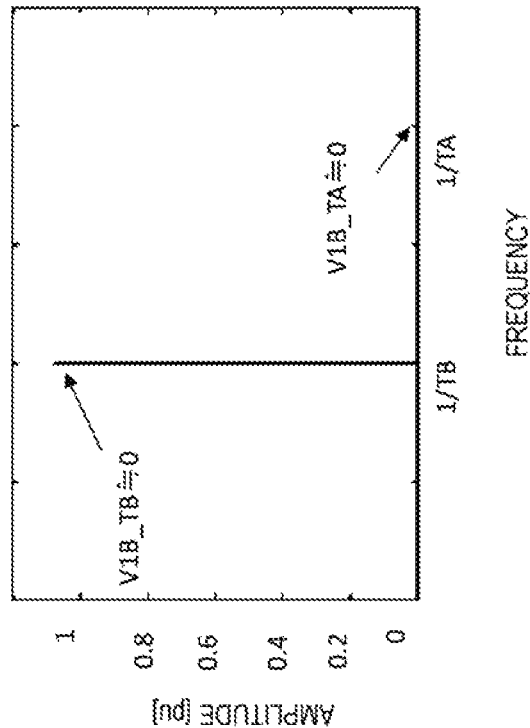

Here, FIG. 15A and FIG. 15B show results of frequency analysis based on actual measurement of the output signal V1B. As a condition for the actual measurement test, TA is set at 50 us and TB is set at 100 us. In FIG. 15A and FIG. 15B, the horizontal axis indicates the frequency and the vertical axis indicates the amplitude of the output signal. FIG. 15A shows a case where AC voltage having the cycle TA is applied to the first excitation winding, and in the output signal V1B, V1B_TA due to the AC voltage having the cycle TA applied to the first excitation winding is superimposed as interference voltage on V1B_TB due to the AC voltage having the cycle TB applied to the second excitation winding. On the other hand, FIG. 15B shows a case where the AC voltage having the cycle TA is not applied to the first excitation winding, and the component V1B_TA having the cycle TA contained in the output signal V1B is almost zero. The same applies to V2B, V2B_TB, and V2B_TA.

Thus, when the angle is calculated using the signals containing V1B_TA, V2B_TA, detection error occurs. Therefore, in order to suppress the angle detection error, it is necessary to remove the first-cycle component V1B_TA from the output signal V1B of the second output winding. Accordingly, the second removal processing unit 603B performs first-cycle component removing processing for removing (reducing) the component having the first cycle TA, on the detected values V1B_S, V2B_S of the output signals from the two second output windings 111B, 112B. Then, the second angle calculation unit 604B calculates the second angle θ2 on the basis of detected values V1B_F, V2B_F of the output signals from the two second output windings 111B, 112B that have undergone the first-cycle component removing processing.

In the present embodiment, the first-cycle component removing processing is performed on the basis of the principle described below. As shown in the graph at the lower stage in FIG. 14, the first-cycle component V1B_TA of the output signal from the second output winding has equal values at a cycle (e.g., the first cycle TA) that is an integer multiple of the first cycle TA. Accordingly, as the first-cycle component removing processing, the second removal processing unit 603B performs subtraction processing to calculate the differences between the detected values V1B_S, V2B_S of the output signals from the two second output windings 111B, 112B detected at the present detection timing, and detected values V1B_Sold, V2B_Sold of the output signals from the two second output windings 111B, 112B detected at a detection timing earlier than the present detection timing by a second system removal processing interval ΔT2. The second system removal processing interval ΔT2 is set to be an integer multiple of the first cycle TA as shown in Expression (10). Here, P is an integer not less than 1. In the present embodiment, P is set at 1, and thus the second system removal processing interval ΔT2 is set at the first cycle TA.

$$\Delta T2 = TA \times P \tag{10}$$

Figure 16:
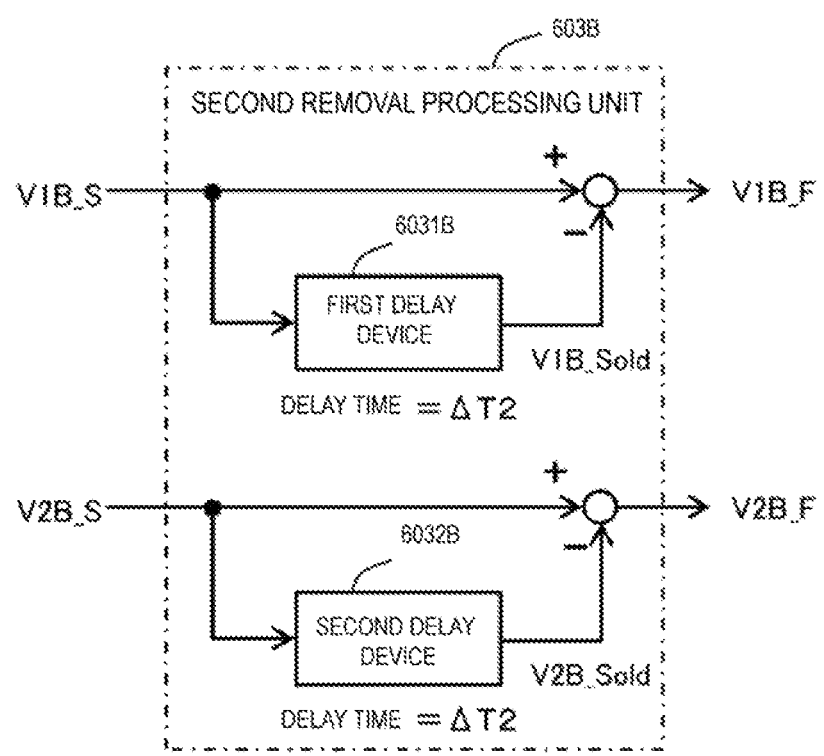
FIG. 16 is a block diagram showing the configuration of a second removal processing unit of the second controller of the electric motor control device according to embodiment 2.

The second removal processing unit 603B is configured as shown in FIG. 16, for example. The second removal processing unit 603B includes a first delay device 6031B which outputs the detected value V1B_S of the output signal from the second output winding with a delay by the second removal processing interval ΔT2, and subtracts the output V1B_Sold of the first delay device 6031B from the detected value V1B_S of the output signal from the second output winding 111B, to calculate the detected value V1B_F of the output signal from the second output winding 111B that has undergone the first-cycle component removing processing. Similarly, the second removal processing unit 603B includes a second delay device 6032B which outputs the detected value V2B_S of the output signal from the second output winding 112B with a delay by the second removal processing interval ΔT2, and subtracts the output V2B_Sold of the second delay device 6032B from the detected value V2B_S of the output signal from the second output winding 112B, to calculate the detected value V2B_F of the output signal from the second output winding 112B that has undergone the first-cycle component removing processing.

The second angle calculation unit 604B is configured to calculate the second angle θ2 on the basis of the detected values V1B_F, V2B_F of the output signals from the second output windings 111B, 112B after the subtraction processing. With this configuration, two first-cycle components having equal values at every second removal processing interval ΔT2 are subjected to the subtraction processing so as to be canceled by each other. Thus, in the detected values V1B_F, V2B_F of the output signals from the two second output windings 111B, 112B after the subtraction processing, the first-cycle components have been removed. Then, on the basis of the detected values from which the first-cycle components have been removed, the second angle θ2 can be accurately calculated.

The second angle calculation unit 604B calculates an arctangent of the ratio between the detected value V1B_F of the output signal from the second output winding 111B and the detected value V2B_F of the output signal from the second output winding 112B that have undergone the first-cycle component removing processing, as shown by Expression (11), thus calculating the second angle θ2.

$$\theta2=\arctan(V1B\_F/V2B\_F) \tag{11}$$

The second angle θ2 is communicated to the first controller 6a by CPU communication. The second angle correction unit 605B receives the second angle θ2 and the first angle Δ1 which is a signal communicated from the first controller 6a. The second angle correction unit 605B calculates the average value of θ2 and θ1 and outputs the average value as the second corrected angle θ2_m.

Next, the second current command value calculator 7b calculates the second q-axis current command value iq2_ref on q axis and the second d-axis current command value candidate id2_ref on d axis for applying currents to the second three-phase windings of the AC electric motor 1, on the basis of the second current command I_target2. The second current command value calculator 7b may substitute values as id2_ref=0 and iq2_ref=I_target2, may perform calculation using known field weakening control, may perform calculation on the basis of known max torque per ampere (MTPA) control, or may use another known calculation method for dq-axis current commands The second d-axis current command value candidate id2_ref for applying currents to the second three-phase windings is communicated to the first controller by CPU communication. The second d-axis current selection unit 606B receives the second d-axis current command value candidate id2_ref which is an output value from the second current command value calculator 7b and the first d-axis current command value candidate id1_ref which is a signal communicated from the first controller 6a. The second d-axis current selection unit 606B selects either id2_ref or id1_ref and outputs the selected one as the d-axis current command value id_ref. The selection is performed in the same manner as in the first d-axis current selection unit 606A.

The coordinate converter 8b performs coordinate conversion of the currents Iu2, Iv2, Iw2 flowing through the second three-phase windings and detected by the second current detector 5b, using the second corrected angle θ2_m outputted from the second angle correction unit 605B, to obtain the second d-axis current value id2 and the second q-axis current value iq2 which are currents on rotating two axes (d-q axes). The subtractor 9b subtracts the second d-axis current value id2 from the d-axis current command value id_ref, and outputs the deviation err_d2. The subtractor 10b subtracts the second q-axis current value iq2 from the second q-axis current command value iq2_ref, and outputs the deviation err_q2. The current controller 11b calculates the second d-axis voltage command value vd2 on rotating two axes (d-q axes) through proportional integral control so that err_d2 obtained from the subtractor 9b coincides with zero. The current controller 12b calculates the second voltage command value vq2 on rotating two axes (d-q axes) through proportional integral control so that err_q2 obtained from the subtractor 10b coincides with zero. The coordinate converter 13b performs coordinate conversion of the second d-axis voltage command value vd2 and the second q-axis voltage command value vq2 on rotating two axes (d-q axes), using the second corrected angle θ2_m, to obtain the second voltage commands Vu2_ref, Vv2_ref, Vw2_ref.

The reason for occurrence of torque ripple due to angle error caused by eccentricity of the resolver is the same as in embodiment 1. The reason why the torque ripple can be suppressed is also the same as in embodiment 1. In the configuration of embodiment 2, the first angle θ1, the second angle θ2, the first d-axis current command value candidate id1_ref, and the second d-axis current command value candidate id2_ref are communicated between the first controller 6a and the second controller 6b. Here, the error Δθ contained in each of the first angle θ1 and the second angle θ2 is an AC quantity. Therefore, for example, if communication delay occurs when the second angle θ2 is communicated to the first controller 6a, phase delay occurs in Δθ contained in the second angle θ2. Thus, even if the average of the first angle θ1 and the second angle θ2 sent from the second controller 6b by communication is calculated, the errors Δθ might not be canceled by each other, so that the angle error cannot be suppressed. The same applies to a case of communicating the first angle θ1 from the first controller 6a to the second controller 6b. Even in such a case, the first d-axis current command value candidate id1_ref, the second d-axis current command value candidate id2_ref, and the d-axis current command value id_ref are DC quantities and therefore are less influenced by communication delay. Thus, torque ripple due to angle error can be favorably suppressed.

Embodiment 3

Figure 17:
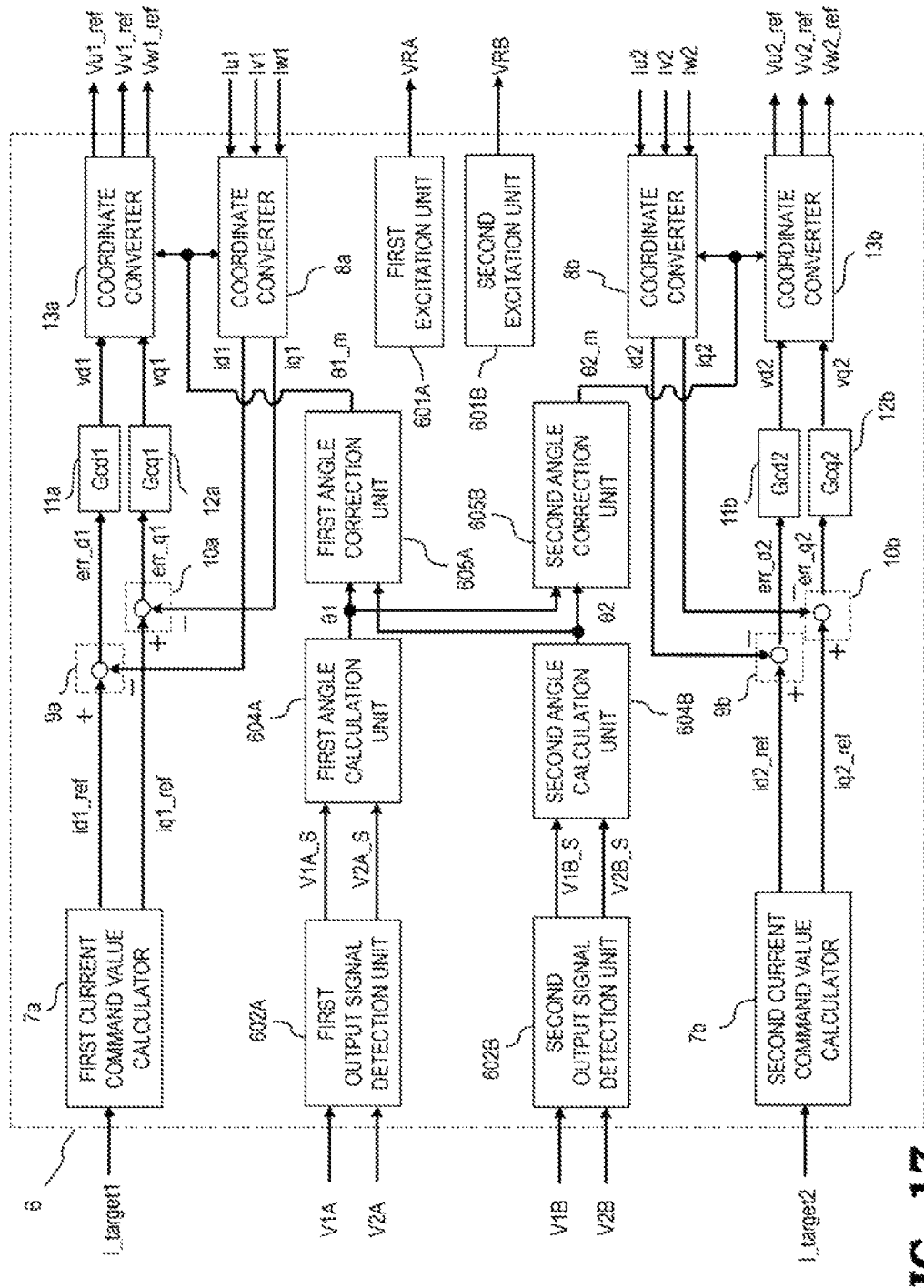
FIG. 17 is a block diagram showing the configuration of a controller of an electric motor control device according to embodiment 3.

FIG. 17 is a block diagram showing the configuration of the controller 6 of an electric motor control device according to embodiment 3. Only one controller 6 is provided as in embodiment 1, and in a case where the detection timings of the first output signal detection unit 602A and the second output signal detection unit 602B are the same, the d-axis current command value for the first three-phase windings and the d-axis current command value for the second three-phase windings do not necessarily need to coincide with each other. In this case, as shown in FIG. 17, the d-axis current selection unit 606 described in embodiment 1 need not be provided. Instead of the d-axis current command value id_ref described in embodiment 1, the first d-axis current command value candidate id1_ref outputted from the first current command value calculator 7a is directly used as the d-axis current command value for the first three-phase windings, i.e., the first d-axis current command value, to calculate the first d-axis voltage command value vd1, and the second d-axis current command value candidate id2_ref outputted from the second current command value calculator 7b is directly used as the d-axis current command value for the second three-phase windings, i.e., the second d-axis current command value, to calculate the second d-axis voltage command value vd2.

Also in this case, as described in embodiment 1, angle correction is performed in the first angle correction unit 605A and the second angle correction unit 605B as shown in Expression (5) and Expression (6), whereby the influence of eccentricity of the resolver can be eliminated.

Embodiment 4

Figure 18:
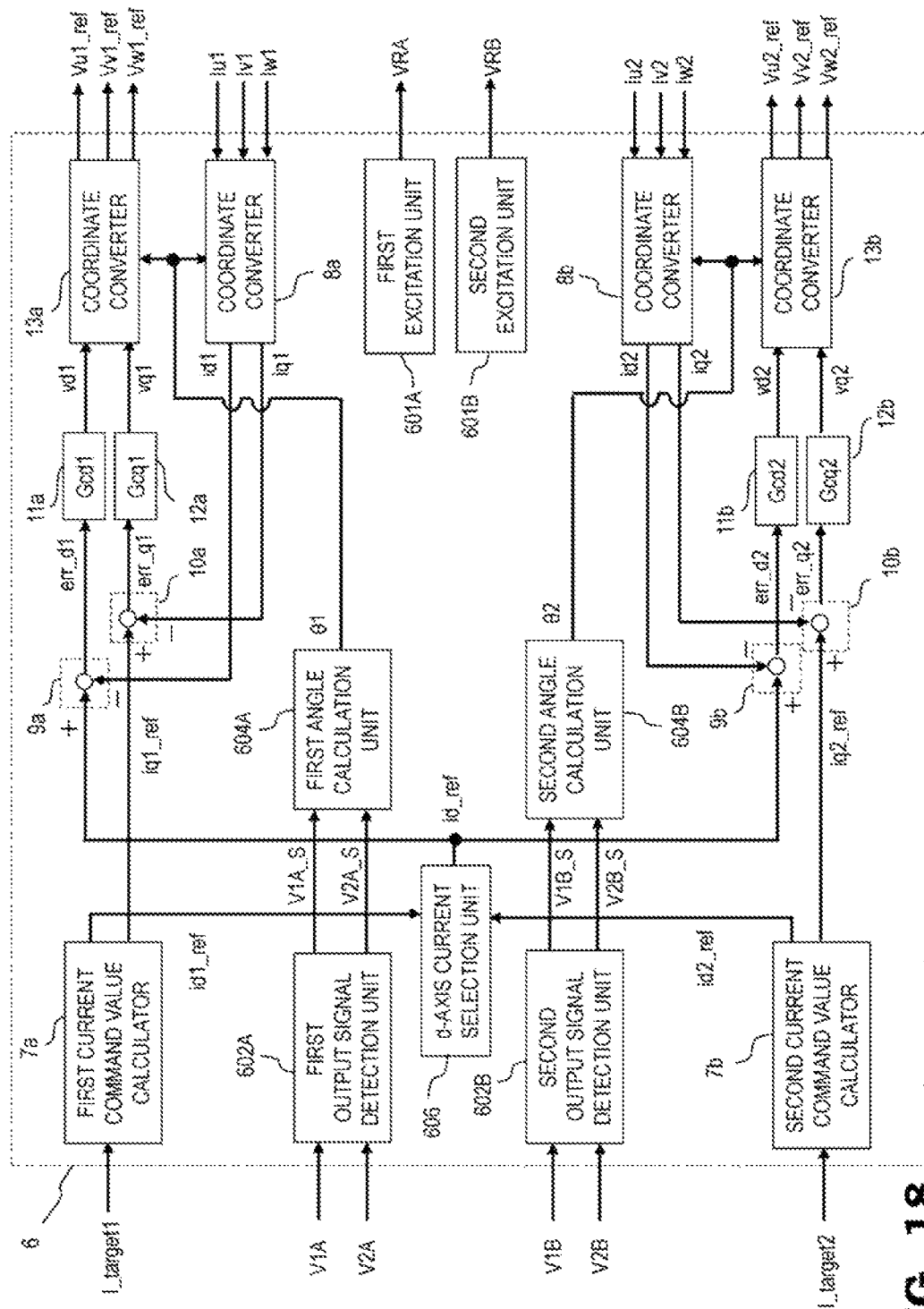
FIG. 18 is a block diagram showing the configuration of a controller of an electric motor control device according to embodiment 4.

FIG. 18 is a block diagram showing the configuration of the controller 6 of an electric motor control device according to embodiment 4. Only one controller is provided as in embodiment 1, and in a case where it is known in advance that the detection timings of the first output signal detection unit 602A and the second output signal detection unit 602B are different from each other, the angle correction shown in Expressions (5) and (6) does not necessarily need to be performed. In this case, as shown in FIG. 18, the output signal of the first angle calculation unit 604A, i.e., the first angle θ1, may be inputted to the coordinate converters 8a, 13a, and the output signal of the second angle calculation unit 604B, i.e., the second angle θ2, may be inputted to the coordinate converters 8b, 13b, whereby coordinate conversion is performed. In this case, the d-axis current command value for the first three-phase windings and the d-axis current command value for the second three-phase windings are made to be the same d-axis current command value id_ref by the d-axis current selection unit 606, and therefore id_c1 and id_c2 in Expression (7) described in embodiment 1 are set at the same value, whereby the influence of eccentricity of the resolver can be eliminated.

Embodiment 5

Figure 19:
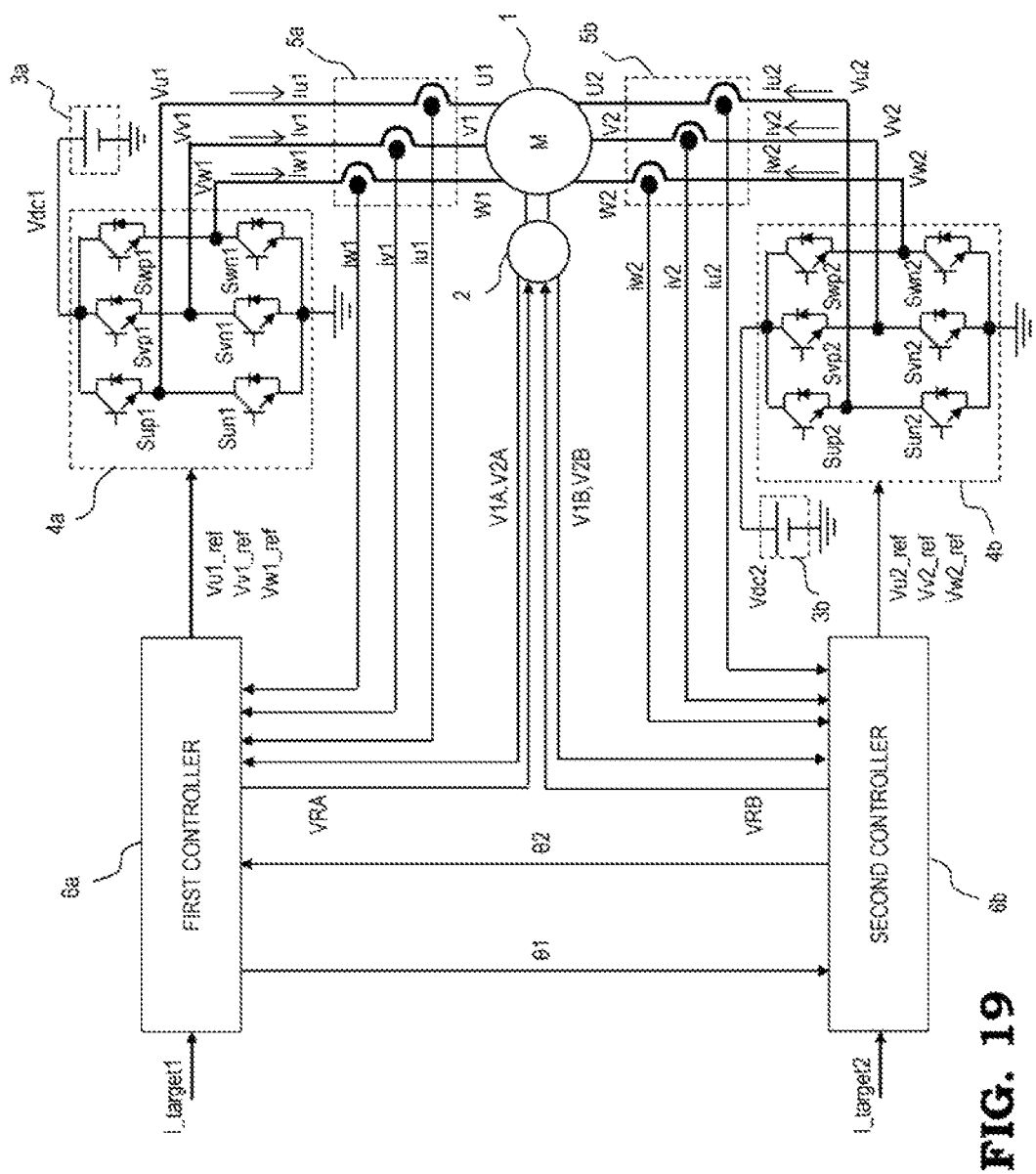
FIG. 19 is a block diagram showing the configuration of an electric motor control device according to embodiment 5.
Figure 20:
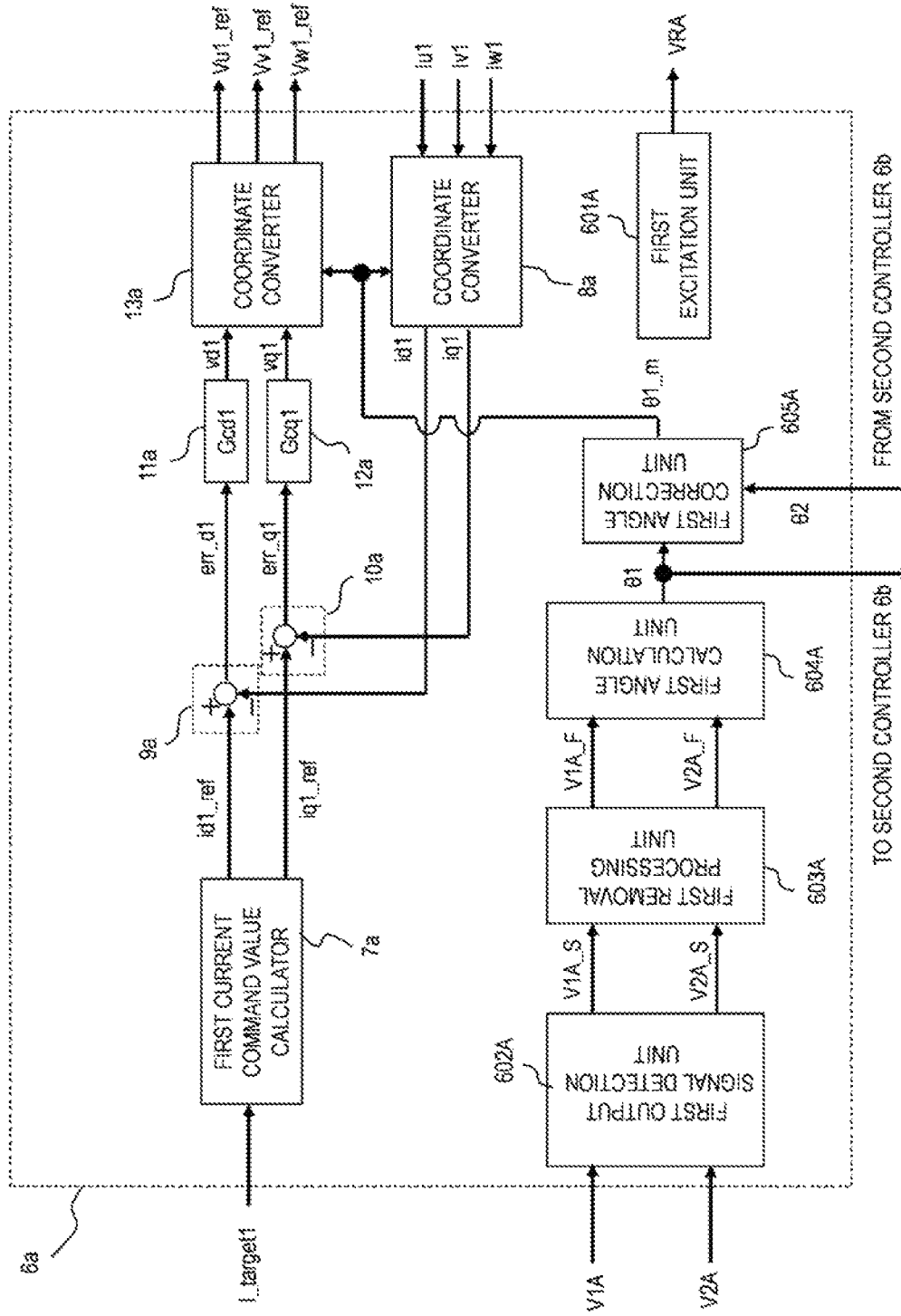
FIG. 20 is a block diagram showing the configuration of a first controller of the electric motor control device according to embodiment 5.
Figure 21:
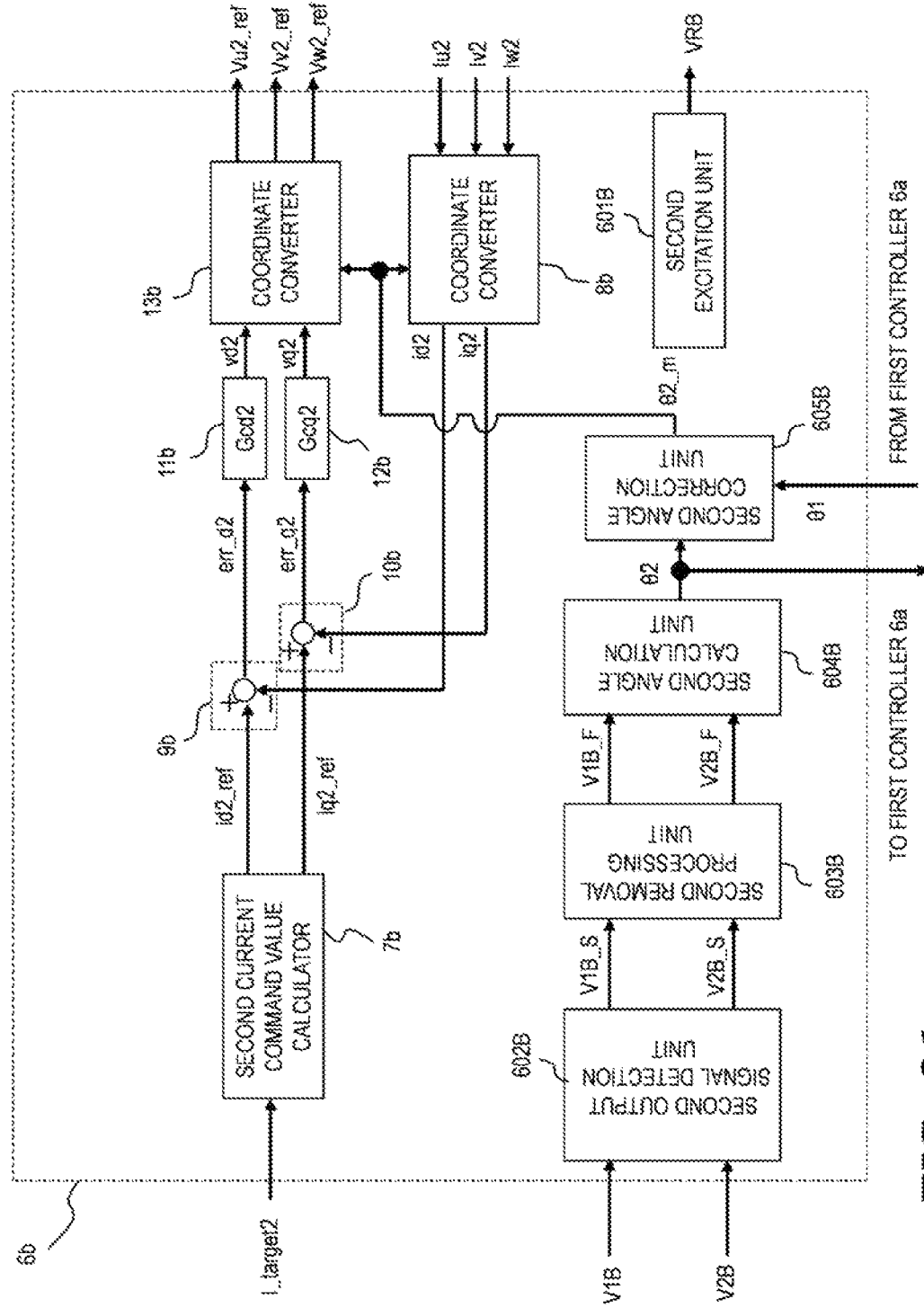
FIG. 21 is a block diagram showing the configuration of a second controller of the electric motor control device according to embodiment 5.

FIG. 19 is a block diagram of an electric motor control device according to embodiment 5. As in embodiment 2, the controller is composed of two controllers, i.e., the first controller 6a and the second controller 6b, and in a case where the detection timings of the first output signal detection unit 602A and the second output signal detection unit 602B are the same and communication delay between the two controllers is small, the d-axis current command value for the first three-phase windings and the d-axis current command value for the second three-phase windings do not necessarily need to coincide with each other. In this case, as shown in FIG. 19, the first d-axis current command value candidate id1_ref and the second d-axis current command value candidate id2_ref need not be communicated between the first controller 6a and the second controller 6b. That is, as in the configurations of the first controller 6a and the second controller 6b shown in FIG. 20 and FIG. 21, the first d-axis current selection unit 606A and the second d-axis current selection unit 606B in embodiment 2 need not be provided. In the first controller 6a, the first d-axis current command value candidate id1_ref outputted from the first current command value calculator 7a is directly used as the d-axis current command value for the first three-phase windings, i.e., the first d-axis current command value, to calculate the first d-axis voltage command value vd1. In the second controller 6b, the second d-axis current command value candidate id2_ref outputted from the second current command value calculator 7b is directly used as the d-axis current command value for the second three-phase windings, i.e., the second d-axis current command value, to calculate the second d-axis voltage command value vd2.

Also in this case, angle correction is performed in each of the first angle correction unit 605A and the second angle correction unit 605B, whereby the influence of eccentricity of the resolver can be eliminated.

Embodiment 6

Figure 22:
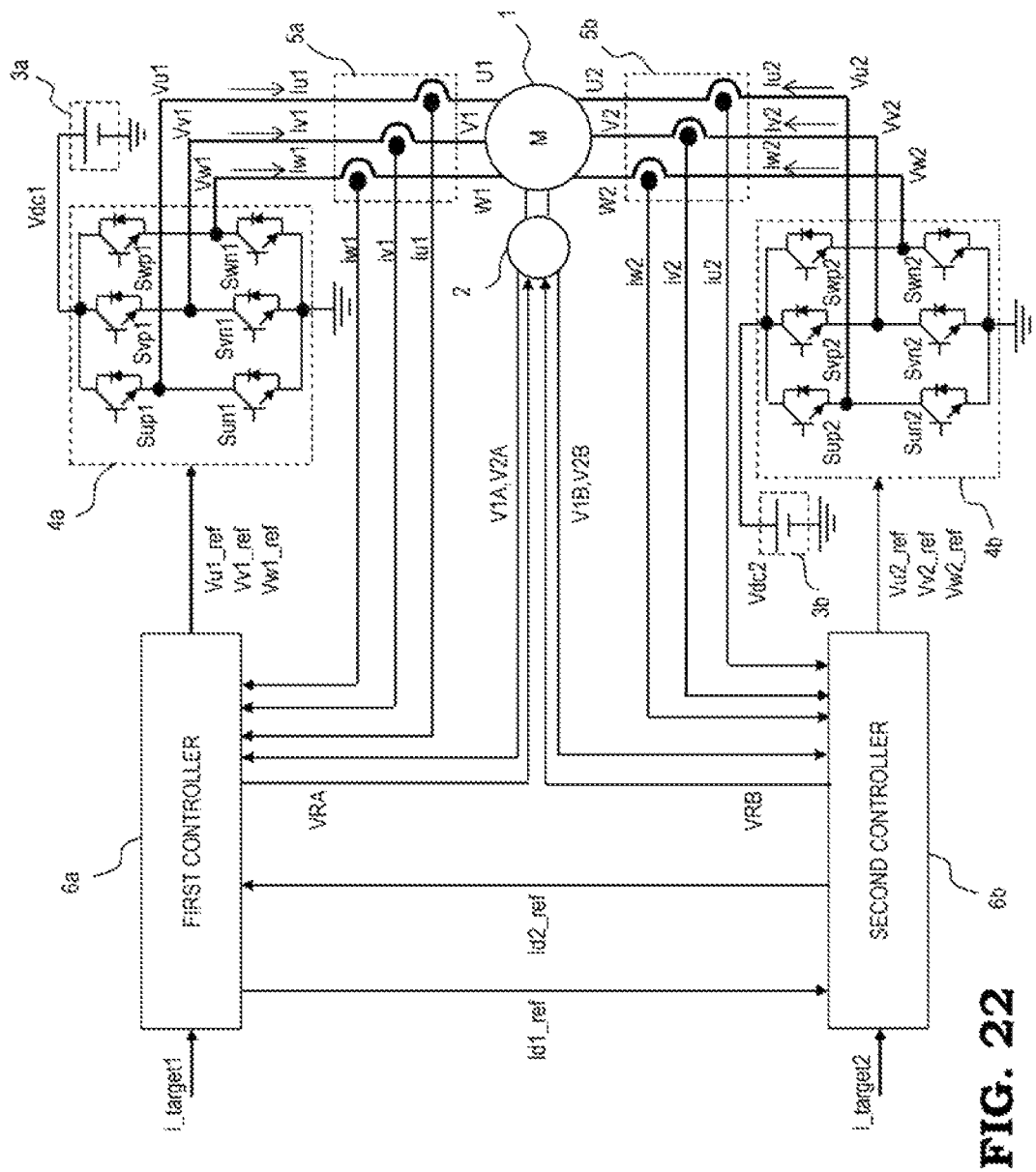
FIG. 22 is a block diagram showing the configuration of an electric motor control device according to embodiment 6.
Figure 23:
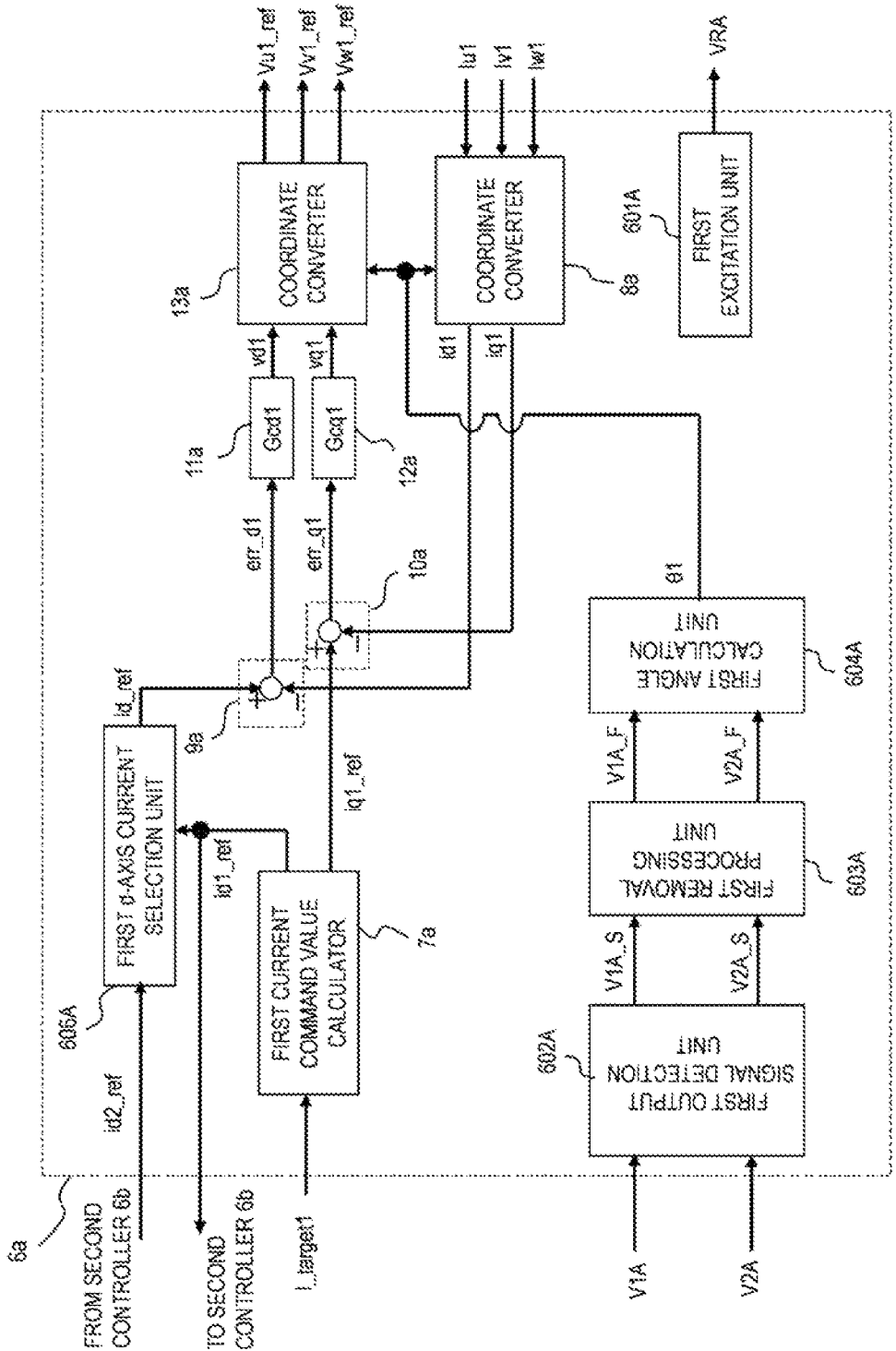
FIG. 23 is a block diagram showing the configuration of a first controller of the electric motor control device according to embodiment 6.
Figure 24:
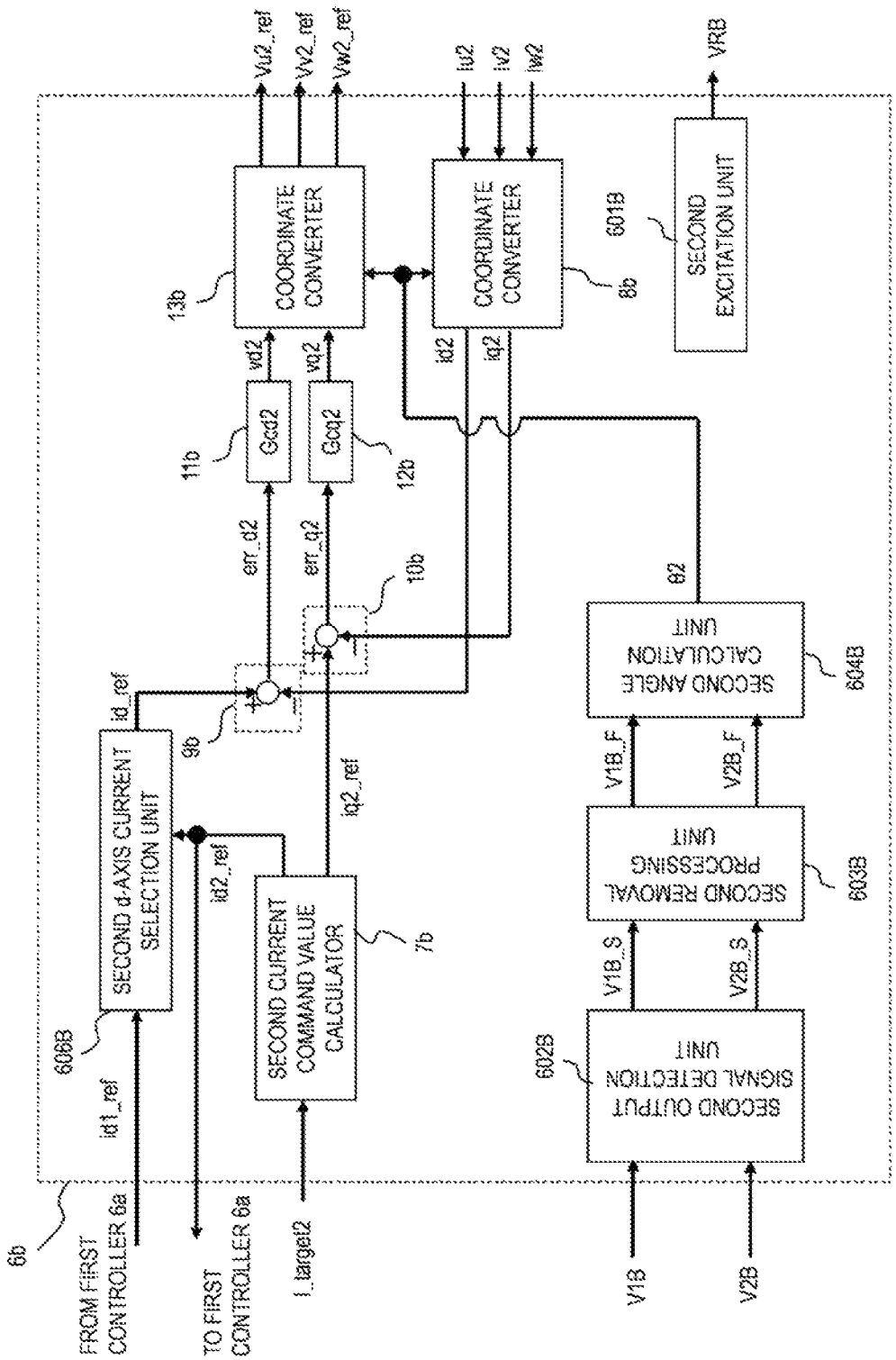
FIG. 24 is a block diagram showing the configuration of a second controller of the electric motor control device according to embodiment 6.

FIG. 22 is a block diagram of an electric motor control device according to embodiment 6. As in embodiment 2, the controller is composed of two controllers, i.e., the first controller 6a and the second controller 6b, and in a case where it is known in advance that the detection timings of the first output signal detection unit 602A and the second output signal detection unit 602B are different from each other or communication delay between the two controllers is not negligible, the angle correction shown in Expression (5) and (6) does not necessarily need to be performed. In this case, as shown in FIG. 22, data of the first angle θ1 and the second angle θ2 need not be communicated between the first controller 6a and the second controller 6b. As in the configurations of the first controller 6a and the second controller 6b shown in FIG. 23 and FIG. 24, the first angle correction unit 605A and the second angle correction unit 605B provided in embodiment 2 are omitted, so that the first angle θ1 which is an output signal from the first angle calculation unit 604A is inputted to the coordinate converters 8a, 13a, and the second angle θ2 which is an output signal from the second angle calculation unit 604B is inputted to the coordinate converters 8b, 13b, whereby coordinate conversion is performed.

Also in this case, data of the first d-axis current command value candidate id1_ref and the second d-axis current command value candidate id2_ref is communicated between the first controller 6a and the second controller 6b, and either id1_ref or id2_ref is selected in the first d-axis current selection unit 606A and the second d-axis current selection unit 606B, so as to be set as the d-axis current command value id_ref in both controllers, whereby the influence of eccentricity of the resolver can be eliminated.

Figure 25:
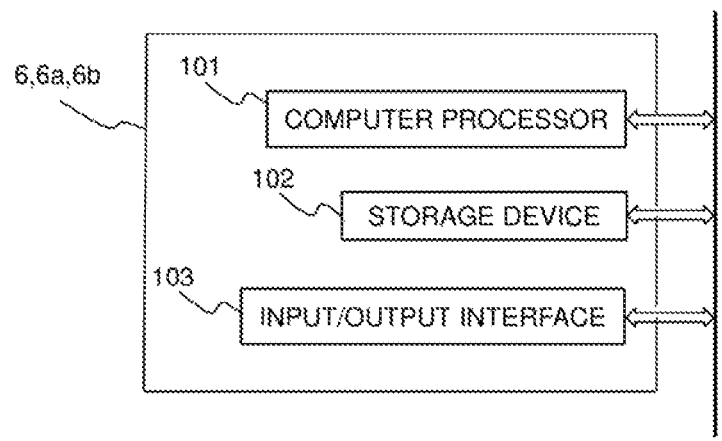
FIG. 25 is a block diagram showing a specific configuration example of each controller of the electric motor control device according to the present disclosure.

The controller 6, the first controller 6a, and the second controller 6b in the above embodiments each include, specifically, a computer processor 101, such as a central processing unit (CPU), a storage device 102 for communicating data to/from the computer processor 101, an input/output interface 103 for inputting/outputting a signal between the computer processor 101 and the outside, and the like, as shown in FIG. 25. As the computer processor 101, an application specific integrated circuit (ASIC), an integrated circuit (IC), a digital signal processor (DSP), a field programmable gate array (FPGA), various signal processing circuits, etc., may be provided. In embodiment 2, etc., the controller 6a and the controller 6b may be formed by one computer processor 101. As the storage device 102, a random access memory (RAM) configured such that data can be read/written by the computer processor 101, a read only memory (ROM) configured such that data can be read by the computer processor 101, etc., are provided. The input/output interface 103 includes, for example, an A/D converter via which signals outputted from the resolver 2 and the current detectors are inputted to the computer processor 101, a D/A converter via which voltage command signals are inputted from the computer processor 101 to the first voltage application unit 4a and the second voltage application unit 4b, etc.

Although various exemplary embodiments and examples are described in the present application, various features, aspects, and functions described in one or more embodiments are not inherent in a particular embodiment, and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component in another embodiment are included.

DESCRIPTION OF THE REFERENCE CHARACTERS

1 AC electric motor
2 resolver
4a first voltage application unit
4b second voltage application unit
5a first current detector
5b second current detector 6 controller
6a first controller
6b second controller
10A first excitation winding
111A, 112A first output winding
10B second excitation winding
111B, 112B second output winding
U1, V1, W1 first three-phase winding
U2, V2, W2 second three-phase winding

The invention claimed is:

1. An electric motor control device configured to control rotation of an AC electric motor having first three-phase windings and second three-phase windings and provided with a resolver in which a plurality of teeth provided to a stator are wound with a first excitation winding and a first output winding as a first system and a second excitation winding and a second output winding as a second system such that a number of the teeth wound with the windings in the first system and a number of the teeth wound with the windings in the second system are equal to each other, the electric motor control device comprising:

a first voltage application circuitry which applies AC voltages for three phases to the first three-phase windings;

a second voltage application circuitry which applies AC voltages for three phases to the second three-phase windings;

a first current detector which detects current for each phase of the first three-phase windings;

a second current detector which detects current for each phase of the second three-phase windings; and a controller which outputs AC voltage to be applied to the first excitation winding and AC voltage to be applied to the second excitation winding, calculates first voltage command values which are voltage command values for three phases in the first voltage application circuitry and outputs the first voltage command values to the first voltage application circuitry, and calculates second voltage command values which are voltage command values for three phases in the second voltage application circuitry and outputs the second voltage command values to the second voltage application circuitry, wherein the controller is configured to perform coordinate conversion of current values for three phases detected by the first current detector into a first d-axis current value and a first q-axis current value, using a first angle obtained from an output of the first system of the resolver, and perform coordinate conversion of current values for three phases detected by the second current detector into a second d-axis current value and a second q-axis current value, using a second angle obtained from an output of the second system of the resolver, select either a first d-axis current command value candidate calculated from a first current command value inputted as a current command value for the first three-phase windings or a second d-axis current command value candidate calculated from a second current command value inputted as a current command value for the second three-phase windings, and set the selected one as a d-axis current command value, calculate a first d-axis voltage command value so that the d-axis current command value and the first d-axis current value coincide with each other, calculate a first q-axis voltage command value so that a first q-axis current command value obtained from the first current command value and the first q-axis current value coincide with each other, and perform coordinate conversion of the first d-axis voltage command value and the first q-axis voltage command value, using the first angle, to calculate the first voltage command values, and calculate a second d-axis voltage command value so that the d-axis current command value and the second d-axis current value coincide with each other, calculate a second q-axis voltage command value so that a second q-axis current command value obtained from the second current command value and the second q-axis current value coincide with each other, and perform coordinate conversion of the second d-axis voltage command value and the second q-axis voltage command value, using the second angle, to calculate the second voltage command values.

2. An electric motor control device configured to control rotation of an AC electric motor having first three-phase windings and second three-phase windings and provided with a resolver in which a plurality of teeth provided to a stator are wound with a first excitation winding and a first output winding as a first system and a second excitation winding and a second output winding as a second system such that a number of the teeth wound with the windings in the first system and a number of the teeth wound with the windings in the second system are equal to each other, the electric motor control device comprising:

a first voltage application circuitry which applies AC voltages for three phases to the first three-phase windings;

a second voltage application circuitry which applies AC voltages for three phases to the second three-phase windings;

a first current detector which detects current for each phase of the first three-phase windings;

a second current detector which detects current for each phase of the second three-phase windings; and a controller which outputs AC voltage to be applied to the first excitation winding and AC voltage to be applied to the second excitation winding, calculates first voltage command values which are voltage command values for three phases in the first voltage application circuitry and outputs the first voltage command values to the first voltage application circuitry, and calculates second voltage command values which are voltage command values for three phases in the second voltage application circuitry and outputs the second voltage command values to the second voltage application circuitry, wherein the controller is configured to perform coordinate conversion of current values for three phases detected by the first current detector into a first d-axis current value and a first q-axis current value, and coordinate conversion of current values for three phases detected by the second current detector into a second d-axis current value and a second q-axis current value, using a corrected angle set as an average value of a first angle obtained from an output of the first system and a second angle obtained from an output of the second system of the resolver, calculate a first d-axis voltage command value so that a first d-axis current command value obtained from a first current command value inputted as a current command value for the first three-phase windings and the first d-axis current value coincide with each other, calculate a first q-axis voltage command value so that a first q-axis current command value obtained from the first current command value and the first q-axis current value coincide with each other, and perform coordinate conversion of the first d-axis voltage command value and the first q-axis voltage command value, using the corrected angle, to calculate the first voltage command values, and calculate a second d-axis voltage command value so that a second d-axis current command value obtained from a second current command value inputted as a current command value for the second three-phase windings and the second d-axis current value coincide with each other, calculate a second q-axis voltage command value so that a second q-axis current command value obtained from the second current command value and the second q-axis current value coincide with each other, and perform coordinate conversion of the second d-axis voltage command value and the second q-axis voltage command value, using the corrected angle, to calculate the second voltage command values.

3. An electric motor control device configured to control rotation of an AC electric motor having first three-phase windings and second three-phase windings and provided with a resolver in which a plurality of teeth provided to a stator are wound with a first excitation winding and a first output winding as a first system and a second excitation winding and a second output winding as a second system such that a number of the teeth wound with the windings in the first system and a number of the teeth wound with the windings in the second system are equal to each other, the electric motor control device comprising:

a first voltage application circuitry which outputs AC voltages for three phases to be applied to the first three-phase windings;

a second voltage application circuitry which outputs AC voltages for three phases to be applied to the second three-phase windings;

a first current detector which detects current for each phase of the first three-phase windings;

a second current detector which detects current for each phase of the second three-phase windings; and a controller which outputs AC voltage to be applied to the first excitation winding and AC voltage to be applied to the second excitation winding, calculates first voltage command values which are voltage command values for three phases in the first voltage application circuitry and outputs the first voltage command values to the first voltage application circuitry, and calculates second voltage command values which are voltage command values for three phases in the second voltage application circuitry and outputs the second voltage command values to the second voltage application circuitry, wherein the controller is configured to perform coordinate conversion of current values for three phases detected by the first current detector into a first d-axis current value and a first q-axis current value, and coordinate conversion of current values for three phases detected by the second current detector into a second d-axis current value and a second q-axis current value, using a corrected angle set as an average value of a first angle obtained from an output of the first system and a second angle obtained from an output of the second system of the resolver, select either a first d-axis current command value candidate obtained from a first current command value inputted as a current command value for the first three-phase windings or a second d-axis current command value candidate obtained from a second current command value inputted as a current command value for the second three-phase windings, and set the selected one as a d-axis current command value, calculate a first d-axis voltage command value so that the d-axis current command value and the first d-axis current value coincide with each other, calculate a first q-axis voltage command value so that a first q-axis current command value obtained from the first current command value and the first q-axis current value coincide with each other, and perform coordinate conversion of the first d-axis voltage command value and the first q-axis voltage command value, using the corrected angle, to calculate the first voltage command values, and calculate a second d-axis voltage command value so that the d-axis current command value and the second d-axis current value coincide with each other, calculate a second q-axis voltage command value so that a second q-axis current command value obtained from the second current command value and the second q-axis current value coincide with each other, and perform coordinate conversion of the second d-axis voltage command value and the second q-axis voltage command value, using the corrected angle, to calculate the second voltage command values.

4. The electric motor control device according to claim 1, wherein the controller applies AC voltages having the same cycle and the same phase to the first excitation winding and the second excitation winding.

5. The electric motor control device according to claim 1, wherein the controller is configured to apply AC voltage having a first cycle to the first excitation winding and apply AC voltage having a second cycle different from the first cycle to the second excitation winding, and remove a component having the second cycle from an output signal of the first output winding, to calculate the first angle, and remove a component having the first cycle from an output signal of the second output winding, to calculate the second angle.

6. The electric motor control device according to claims 1, wherein the controller includes a first controller which receives an output of the first current detector and the first current command value and outputs the first voltage command values, and a second controller which receives an output of the second current detector and the second current command value and outputs the second voltage command values.

7. The electric motor control device according to claim 2, wherein the controller applies AC voltages having the same cycle and the same phase to the first excitation winding and the second excitation winding.

8. The electric motor control device according to claim 3, wherein the controller applies AC voltages having the same cycle and the same phase to the first excitation winding and the second excitation winding.

9. The electric motor control device according to claim 2, wherein
the controller is configured to
apply AC voltage having a first cycle to the first excitation winding and apply AC voltage having a second cycle different from the first cycle to the second excitation winding, and
remove a component having the second cycle from an output signal of the first output winding, to calculate the first angle, and remove a component having the first cycle from an output signal of the second output winding, to calculate the second angle.

10. The electric motor control device according to claim 3, wherein
the controller is configured to
apply AC voltage having a first cycle to the first excitation winding and apply AC voltage having a second cycle different from the first cycle to the second excitation winding, and
remove a component having the second cycle from an output signal of the first output winding, to calculate the first angle, and remove a component having the first cycle from an output signal of the second output winding, to calculate the second angle.

11. The electric motor control device according to claim 2, wherein
the controller includes a first controller which receives an output of the first current detector and the first current command value and outputs the first voltage command values, and a second controller which receives an output of the second current detector and the second current command value and outputs the second voltage command values.

12. The electric motor control device according to claim 3, wherein
the controller includes a first controller which receives an output of the first current detector and the first current command value and outputs the first voltage command values, and a second controller which receives an output of the second current detector and the second current command value and outputs the second voltage command values.

* * * * *